United States Patent
Lee et al.

(10) Patent No.: US 8,452,345 B2
(45) Date of Patent: May 28, 2013

(54) PORTABLE TERMINAL AND DRIVING METHOD OF MESSENGER PROGRAM IN PORTABLE TERMINAL

(75) Inventors: Jin Baek Lee, Seoul (KR); Jong Hwan Kim, Seoul (KR); Seon Hwi Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 703 days.

(21) Appl. No.: 12/350,033

(22) Filed: Jan. 7, 2009

(65) Prior Publication Data

US 2010/0001849 A1   Jan. 7, 2010

(30) Foreign Application Priority Data

Jul. 1, 2008   (KR) .................. 10-2008-0063456

(51) Int. Cl.
*H04M 1/00*   (2006.01)
(52) U.S. Cl.
USPC .................. 455/567; 340/407.1; 345/173
(58) Field of Classification Search
USPC ........ 340/407.1, 407.2, 573.4, 686.6, 539.13, 340/539.23; 455/567; 345/173, 177
See application file for complete search history.

(56) References Cited

U.S. PATENT DOCUMENTS

| | | | |
|---|---|---|---|
| 5,298,883 A * | 3/1994 | Pilney et al. | 340/573.2 |
| 6,653,930 B1 * | 11/2003 | Bonomo et al. | 340/7.59 |
| 6,963,762 B2 * | 11/2005 | Kaaresoja et al. | 455/567 |
| 2003/0166405 A1 * | 9/2003 | Jauk et al. | 455/566 |
| 2004/0058718 A1 * | 3/2004 | Yu | 455/567 |
| 2006/0248183 A1 * | 11/2006 | Barton | 709/224 |
| 2007/0080951 A1 * | 4/2007 | Maruyama et al. | 345/173 |
| 2008/0204266 A1 * | 8/2008 | Malmberg et al. | 455/418 |
| 2009/0017806 A1 * | 1/2009 | Hayakawa et al. | 455/564 |

FOREIGN PATENT DOCUMENTS

| KR | 10-0772582 | 10/2007 |
|---|---|---|
| KR | 10-2008-0026979 | 3/2008 |

* cited by examiner

*Primary Examiner* — Thomas Mullen
(74) *Attorney, Agent, or Firm* — KED & Associates, LLP

(57) ABSTRACT

A portable terminal is provided to inform a user of status information via vibration pattern. The portable terminal may include a vibration generation unit for vibrating the portable terminal and a controller changing status information of a messenger program or a member relative to the messenger program to a vibration pattern while performing the messenger program, and the controller controlling the operation of the vibration generation unit in response to the vibration pattern such that the portable terminal can perform a messenger service by way of an interface unit using tactile sensation to enhance a user's convenience and satisfaction.

29 Claims, 25 Drawing Sheets

PORTABLE TERMINAL AND DRIVING METHOD OF MESSENGER PROGRAM IN PORTABLE TERMINAL

The present application claims priority from Korean Application No. 10-2008-0063456, filed Jul. 1, 2008, the subject matter of which is incorporated herein by reference.

BACKGROUND

1. Field

Embodiments of the present invention may relate to a portable terminal capable of driving a messenger program. More particularly, embodiments of the present invention may relate to a portable terminal and driving method of a messenger program to inform a user of status information via a vibration pattern.

2. Background

A portable terminal is a mobile device that may have one or more functions, such as performance of voice and video call communication, data input/output and data storage.

The portable terminal is a comprehensive multimedia device that can support various operations, such as capturing images or videos, reproducing music or video files, allowing a user to play games and receiving broadcast contents.

In order to implement complex functions, hardware and/or software implementations are developed. For example, a user interface may be provided that allows the user to search for and select various functions.

Along with hardware performance enhancement of a portable terminal and development of wireless data communication for the portable terminal, a messenger service (i.e., MSN of Microsoft, Inc.) utilizing the Internet has been provided for a personal computer and is also available for portable terminals.

The messenger service of the portable terminal is currently utilized in a name of an Instant Message (IM). Improvement of various user interfaces on the portable terminal may make it convenient to use a messenger function on the portable terminal.

BRIEF DESCRIPTION OF THE DRAWINGS

Embodiments and arrangements may be described in detail with reference to the following drawings in which the references refer to the elements and wherein.

DETAILED DESCRIPTION

Figure 1:
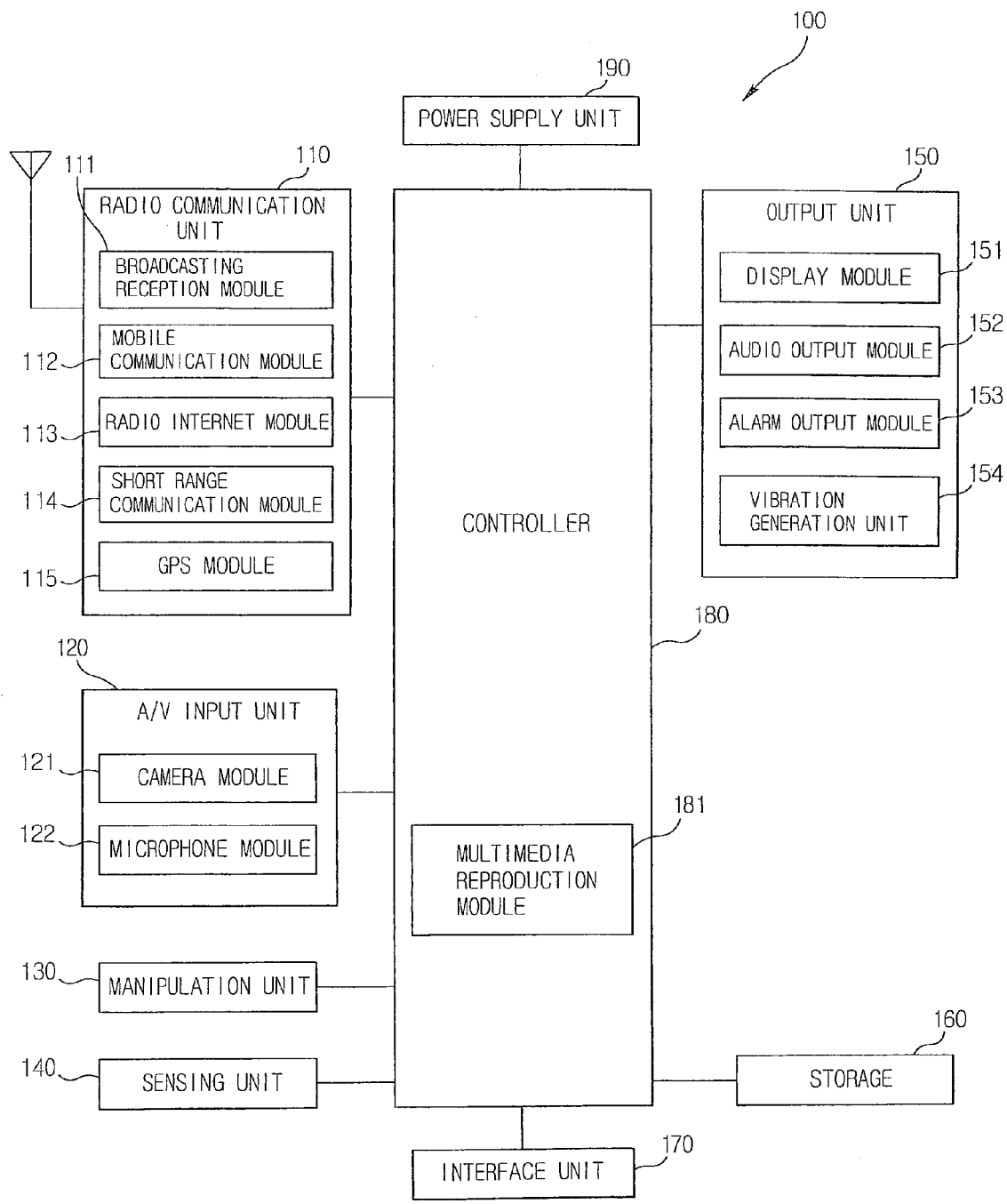
FIG. 1 is a block diagram of a portable terminal according to an exemplary arrangement.

FIG. 1 is a block diagram of a portable terminal according to an exemplary arrangement. Other arrangements may also be provided. The portable terminal may be a mobile terminal (or mobile phone).

FIG. 1 shows that a portable terminal 100 may include a radio communication unit 110, an A/V (Audio/Video) input unit 120, a manipulation unit 130, a sensing unit 140, an output unit 150, storage 160 (or storage device), an interface unit 170, a controller 180, a power supply unit 190, and other elements. Two or more constitutional elements may be combined in a single element or a single element may be divided into two or more elements when in actual implementation.

The radio communication unit 110 may include a broadcasting reception module 111, a mobile communication module 112, a radio internet module 113, a short-range communication module 114 and a GPS module 115.

The broadcasting reception module 111 may receive broadcasting signals and/or broadcasting related information from an external broadcasting management server (not shown) via a broadcasting channel. The broadcasting channel may include a satellite channel or a terrestrial channel or some other type of communication channel. The broadcasting management server may refer to a server that generates and transmits broadcasting signals and/or broadcasting associated information or the broadcasting management server may refer to a server that receives previously generated broadcasting signals and/or broadcasting associated information and transmits such information to a terminal. The broadcasting associated information may refer to information related to a broadcasting channel, a broadcasting program or a broadcasting service provider. The broadcasting signal may include, not only a TV broadcasting signal, a radio broadcasting signal, or a data broadcasting signal, but also a broadcasting signal obtained by combining a data broadcasting signal with a TV broadcasting signal or a radio broadcasting signal.

The broadcasting associated signal may be provided via a mobile communication network, and in such a case, such information may be received by the mobile communication module 112.

The broadcasting associated information may be implemented in various formats. For example, the broadcasting associated information may include an Electronic Program Guide (EPG) of a Digital Multimedia Broadcasting (DMB) format, or an Electronic Service Guide (ESG) of a Digital Video Broadcasting-Handheld (DVB-H) format.

The broadcasting reception module 111 may receive broadcasting signals by using various digital broadcasting techniques. More particularly, the digital broadcasting signals may be received by using digital broadcasting techniques, such as DMB-T (Digital Multimedia Broadcasting-Terrestrial), DMB-T (Digital Multimedia Broadcasting-Satellite), MediaFLO (Media Forward Link Only), DVB-H (Digital Video Broadcasting-Handheld) and ISDB-T (Integrated Services Digital Broadcasting-Terrestrial). The broadcasting reception module 111 may be suitable for any other broadcasting techniques that provide broadcasting signals and information.

The broadcasting signals and/or broadcasting associated information received via the broadcasting reception module 111 may be stored in the storage 160.

The mobile communication module 112 may transmit and receive radio signals to and from at least one of a base station, an external terminal and a server of a mobile communication network. The radio signals may include voice call signals, video (or conference) communication call signals, data in various formats based on the transmission and reception techniques used, text/multimedia messages and other types of information.

The radio internet module 113 may be a module that supports radio access to a network such as Internet. The radio internal module 113 may be installed in the portable terminal or may be implemented as an internal element or an external element.

The short range communication module 114 may be a module that supports short range communications. Suitable technologies for implementing this module may include Bluetooth, Radio Frequency Identification (RFID), Infrared Data Association (IrDA), Ultra Wideband (UWB) and Zig-Bee. The GPS module 115 may receive navigational information from a plurality of satellites.

The A/V input unit 120 may receive audio signals or video signals and may include a camera module 121 and a microphone module 122. The camera module 121 may process image frames such as motionless images or videos (moving images) that are obtained by an image sensor in a video call (or video conference) mode or in an image capture mode. The processed image frames may then be displayed on a display module 151.

The image frames processed by the camera module 121 may be stored in the storage 160 or may be transmitted to outside the portable terminal via the radio communication unit 110. Two or more camera modules 121 may be provided according to configuration and aspects of the portable terminal.

The microphone module 122 may receive an external sound signal from a microphone in a calling mode, a recording mode or a voice recognition mode and may process such sound signals into an electrical audio (voice) data. The processed audio data may be converted for output into a format that can be transmittable to a mobile communication base station via the mobile communication module 112 in a calling mode. The microphone module 122 may include noise canceling algorithms (or other processing mechanisms) to cancel noise generated in the course of receiving the external audio signals.

The manipulation unit 130 (or input unit) may generate key input data based on user inputs to control operations of the portable terminal. The manipulation unit 130 may be a key pad, a dome switch, a touch pad (e.g., employing touch recognition techniques based on pressure, capacitance, resistance and the like), a jog wheel and a jog dial switch. When the touch pad is combined with the display module 151, as will be described below, in a layered structural manner, the combination may be referred to as a touch screen.

The sensing unit 140 may sense a current state (or configuration) of the portable terminal (i.e., an opened state or a closed state), a location (or orientation) of the portable terminal 100, and/or whether the user has touched a certain portion of the portable terminal. Based on such sensing, a sensing signal may be generated for controlling operation of the portable terminal 100.

For example, if the portable terminal is a slide-type portable terminal, the sensing unit 140 can sense whether a slide portion of the slide type portable terminal is opened or closed with respect to a main body portion of the portable terminal. The sensing unit 140 may also perform a sensing function to detect whether the power supply unit 190 has supplied power or whether the interface unit 170 is connected with an external device.

The interface unit 170 may interface with various external devices that can be connected with the portable terminal 100. The various external devices may include a wired or wireless headset, an external charger, a wired or wireless data port, a card socket (i.e., for coupling a memory card or a SIM/UIM card), an audio input/output port, a video input/output port, and an earphone. The interface unit 170 may receive data from the external device or may be provided with power such that the received data or power can be delivered to particular elements of the portable terminal 100 or may be used to transmit data and other information from the portable terminal 100 to the external device.

The output unit 150 may provide outputs such as audio signal, a video signal or an alarm signal. The output unit 150 may include a display module 151, an audio output module 152, an alarm output module 153 and/or a vibration generation unit 154.

The display module 151 may output and display information processed by the portable terminal 100. For example, the display module 151 may display a particular User Interface (UI) or Graphic User Interface (GUI) related to the call operation when the portable terminal 100 is in a calling mode. The display module 151 may display a captured and/or received image, or a particular UI and/or GUI when the portable terminal 100 is in a video calling mode or an image capturing mode.

If the display module 151 and the touch pad are formed together in a layered manner to form a touch screen, the display module 151 may be used as an input device as well as an output device. The display module 151 may include at least one of a liquid crystal display, a thin film transistor-liquid crystal display, an organic light emitting diode, a flexible display and a three-dimensional (3D) display. The display module 151 may include two or more such displays according to a particular implementation of the portable terminal 100. For example, the portable terminal 100 may be provided with an external display module (not shown) and an internal display module (not shown) at a same time.

The audio output module 152 may output audio data that has been received from the radio communication unit 110 in a call signal reception mode, a calling mode, a recording mode, a voice recognition mode or a broadcasting reception mode. The audio output module 152 may also output audio data that has been stored in the storage 160. The audio output module 152 may output an audio signal related to a function (e.g., a call signal reception sound and a message reception sound) performed by the portable terminal 100. The audio output module 152 may include a speaker and a buzzer, for example.

The alarm output module 153 may output a signal that indicates an occurrence of an event of the portable terminal 100. The event occurring in the portable terminal 100 may be, for example, a call signal reception requesting a telephone call, a message reception, a key signal input and an alarm that indicates a predetermined time. The alarm output module 153 may output a signal indicating an occurrence of an event in a format other than an audio signal or a video signal. The alarm output module 153 may output a signal, for example, in the form of a vibration. When a call signal or a message is received, the alarm output module 153 may provide a vibration in order to inform about the received call signal or message. When a key signal is received, the alarm output module 153 may provide vibrations as feedback of the inputted key signal. The user may recognize the occurrence of an event based on the vibrations. The occurrence of an event may be informed to the user via the display module 151 and/or the audio output module 152.

The storage 160 (or storage device) may store software programs (or codes, instructions, etc.) to support processing and controlling performed by the controller 180. The storage 160 may temporarily store inputted or outputted data (e.g., a phone book, a message, a still image, or video).

The storage 160 may include a storage medium of at least one of a flash type memory, a hard disk type memory, a multimedia card, a card type memory (e.g., SD card, XD card, etc.), a RAM and a ROM, for example. The portable terminal 100 may cooperate with a network storage device capable of performing the functions of the storage 160 via network access (such as via the Internet).

The controller 180 may control general operations of the portable terminal. For example, the controller 180 may perform controlling and processing associated with handling a voice call, data communication, a video call, etc. In addition, the controller 180 may include a multimedia reproduction module 181 for reproducing multimedia data. The multimedia reproduction module 181 may be formed as a hardware component within the controller 180 or may be formed as a software component separately from the controller 180.

The controller 180 may identify a proximity touch or a direct touch of the touch screen by an object (e.g., a finger of a user or a stylus) to change size or area of a screen displayed on the touch screen. The controller 180 may be formed with a scroll bar or a mini map for controlling size or area of a screen displayed on the touch screen. A further detailed description of the controller 180 will be provided below.

The power supply unit 190 receives external power or internal power and supplies the power required for operation of various elements under control of the controller 180.

In the above description, the portable terminal is explained in terms of elements from the perspective of their functions. Hereinafter, the portable terminal according to embodiments of the present invention may be explained in terms of external elements with reference to FIGS. 2 and 3. For simplicity, a touch screen-type portable terminal (among different types of portable terminals such as a folder type, a bar type, a swing type and a slider type) may be referenced to explain exemplary implementations. However, features described herein are not limited to a touch screen-type portable terminal, but rather can be applicable to other types of portable terminals.

Figure 2:
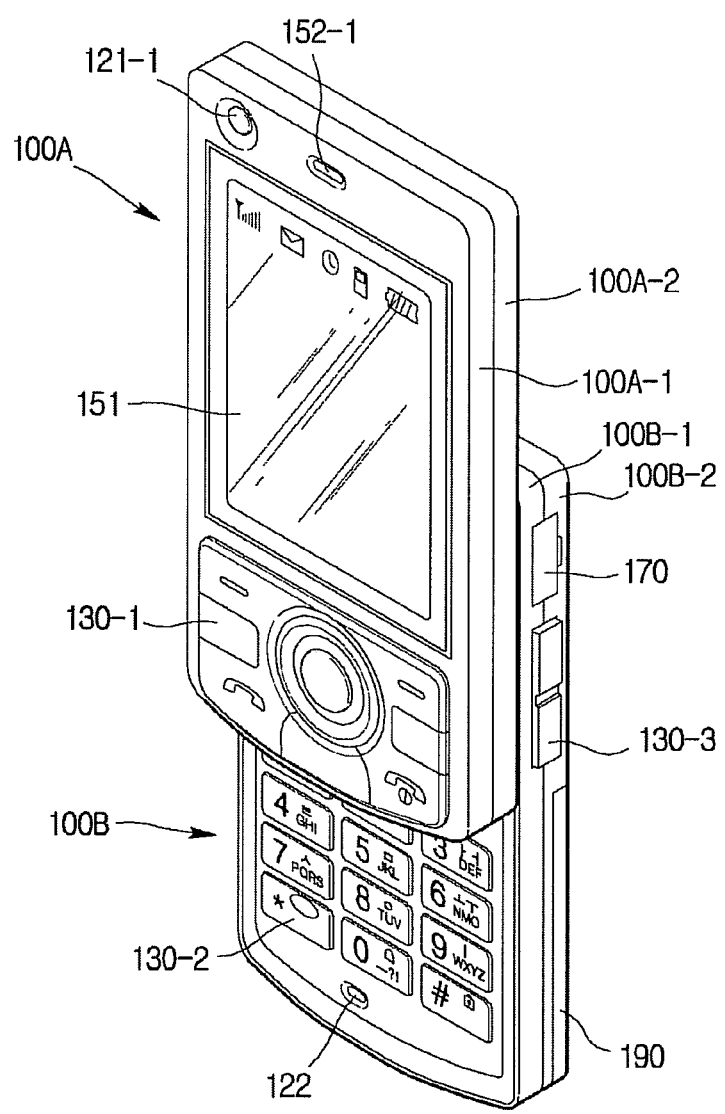
FIG. 2 is a front perspective view of a portable terminal according to an exemplary arrangement.

FIG. 2 is a front perspective view of a portable terminal according to an exemplary arrangement. Other arrangements may also be provided.

As shown in FIG. 2, the portable terminal 100 may include a first body 100A and a second body 100B that is slidably moving along at least one direction on the first body 100A. A state in which the first body 100A overlaps the second body 100B may be called a closed configuration. As shown in FIG. 2, a state in which the first body 100A is moved to expose at least a portion of the second body 100B may be called an open configuration.

In the closed configuration, the portable terminal may operate mainly in a standby mode, and the standby mode may be released according to a user manipulation. In the open configuration, the portable terminal may operate mainly in the calling mode, and the operation state may be changed into the standby mode upon lapse of a certain time or according to a user manipulation.

The case (i.e., a casing, a housing, a cover, etc.) constituting an external appearance of the first body 100A may include a first front case 100A-1 and a first rear case 100A-2, and various electronic components may be installed in a space therebetween. One or more intermediate cases may be additionally provided between the first front case 100A-1 and the first rear case 100A-2.

The cases may be formed by injection-molding of a synthetic resin or may be made of a metallic material, such as stainless steel (STS) or titanium (Ti).

The display module 151, the first audio output module 152-1, the first camera module 121-1 or a first manipulation unit 130-1 may be provided on the first body 100A (e.g., substantially on the first front case 100A-1).

The display module 151 may include a Liquid Crystal Display (LCD), an Organic Light Emitting Diode (OLED), or the like that visually displays information.

A touch panel (or touch pad) may be overlaid (overlapped, superimposed, covered) on the display module 151 in a layered manner to allow the display module 151 to operate as a touch screen, whereby the user may input information or commands by touching the display module 151. The touch screen may be considered an input device to receive pointing information from an object such as a finger or a stylus.

The first audio output module 152-1 may be implemented as a receiver or a speaker to output various types of sounds.

The first camera module 121-1 may be suitably implemented for capturing still images, moving images, videos, or other visual information.

The manipulation unit 130-1 may receive user commands for controlling network contents reproduction and travel guide operations.

Similar to the first body 100A, the case constituting an external appearance of the second body 100B may include a second front case 100B-1 and a second rear case 100B-2.

A second manipulation unit 130-2 may be provided on the second body 100B, and more specifically may be provided on a front face portion of the second front case 100B-1.

A third manipulation unit 130-3, a microphone module 122, and an interface unit 170 may be provided on the second front case 100B-1 or the second rear case 100B-2.

The first, second and third manipulation units 130-1, 130-2, 130-3 may be collectively referred to as the manipulation unit 130, and any means can be employed as the first, second and third manipulation units 130-1, 130-2, 130-3 provided they can be operated in a tactile manner.

For example, the manipulation unit 130 may be implemented by using dome switches or touch pads that can receive a user command or information according to press or touch operation by the user (i.e., pointing information). The manipulation unit 130 may also be implemented using a mechanical manipulation means, such as a rotatable element (e.g., a wheel, dial, jog button, thumbwheel, etc.) or a linear movement element (e.g., a joystick, lever, knob, etc.). The manipulation unit 130 may receive pointing information based on an object or based on movement of a cursor using the rotatable element or the linear movement element.

The first manipulation unit 130-1 may include one or more function keys used for inputting a command such as start, end or scroll, and the second manipulation unit 130-2 may include one or more keypads for inputting numbers, characters, and symbols.

The third manipulation unit 130-3 may be a hot key for activating a special function of the portable terminal.

The microphone module 122 may receive a voice of the user or other sounds.

The interface unit 170 may be used as a passage (path or link) that allows data to be exchanged with an external device through a wired or wireless medium. For example, the interface unit 170 may be a connection port used for connection of an ear jack, earphones, and the like, a communication port that supports short-range communications (e.g., an IrDA port, a Bluetooth™ port, a wireless LAN port, etc.), and a power supply port for supplying power to the portable terminal.

The interface unit 170 may include a card socket for receiving or accommodating a card-like medium, such as a Subscriber Identification Module (SIM) card, a User Identity Module UIM card and/or a memory card for storing information.

The power supply unit 190 may be mounted at a side (or edge) portion of the second rear case 100B-2 for supplying power to the portable terminal 100. The power supply 190 may be a rechargeable battery that can be releasably attached with the portable terminal.

Figure 3:
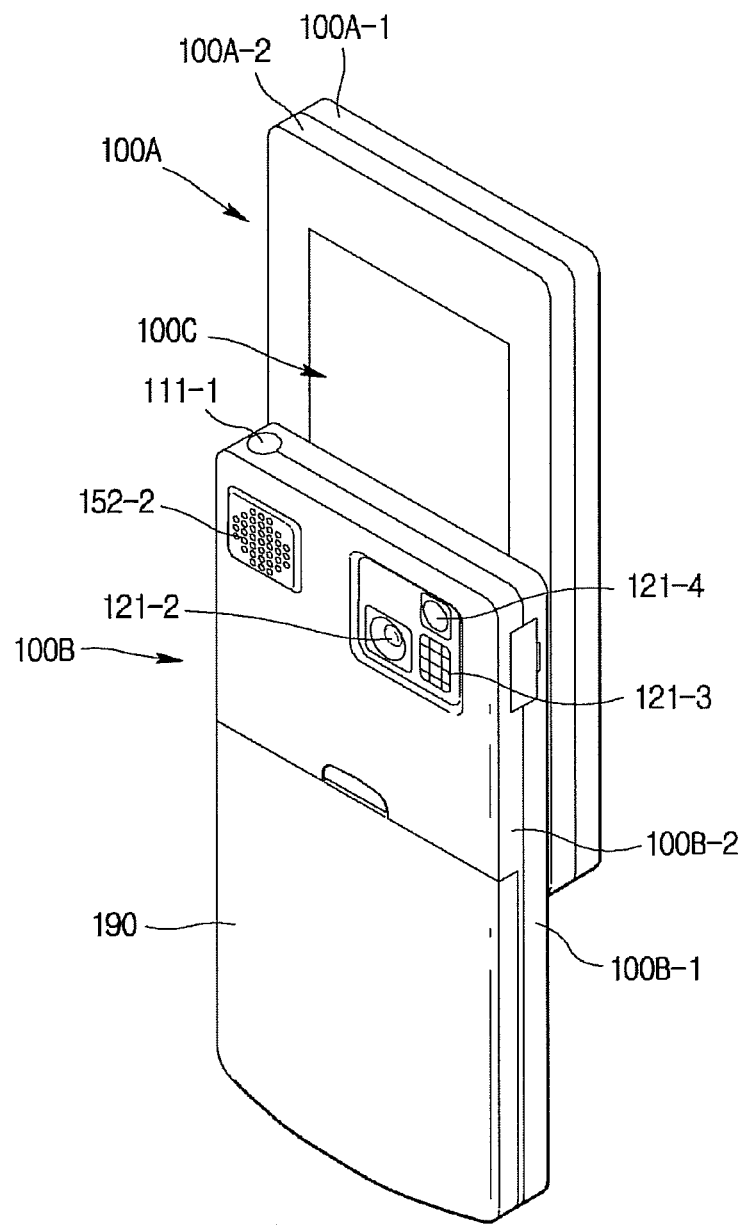
FIG. 3 is a rear perspective view of a portable terminal according to an exemplary arrangement.

FIG. 3 is a rear perspective view of a portable terminal according to an exemplary arrangement. Other arrangements may also be provided.

As shown in FIG. 3, a second camera module 121-2 may be additionally mounted on a rear surface of the second rear case 100B-2 of the second body 100B. The second camera module 121-2 may have an image capture direction that is substantially opposite to an image capture direction of the first camera module 121-1 shown in FIG. 1. The second camera module 121-2 may support a different number of pixels when compared to the first camera module 121-1.

The first camera module 121-1 may be used for low resolution (i.e., supporting a relatively small number of pixels) to quickly capture an image (or video) of a user's face for immediate transmission to another party during video conferencing or the like, while the second camera module 121-2 may be used for high resolution (i.e., supporting a relatively large number of pixels) in order to capture more detailed (i.e., higher quality) images or video that typically do not need to be transmitted immediately.

A flash 121-3 and a mirror 121-4 may be adjacently disposed at the second camera module 121-2. When an image of a subject is captured by the second camera module 121-2, the flash 121-3 may illuminate the subject. The mirror 121-4 may allow the user to see himself or herself when he or she wants to capture his or her own image (i.e., perform a self-image capturing) by using the second camera module 121-2.

A second audio output module 152-2 may be additionally provided on the second rear case 100B-2. The second audio output module 152-2 may implement a stereophonic function in conjunction with the first audio output module 152-1 shown in FIG. 2. The second audio output module 152-2 may be used in a speaker phone mode for call communication.

A broadcasting signal reception antenna 111-1 may be provided at one side of the second rear case 100B-2 in addition to an antenna used for call communication. The antenna 111-1 may be installed such that the antenna 111-1 may extend from the second body 100B.

One part of a slide module 100C that slidably connects the first body 100A with the second body 100B may be disposed on the first rear case 100A-2 of the first body 100A. The other part of the slide module 100C may be disposed on the second front case 100B-1 of the second body 100B, which may not be exposed to the outside as shown in FIG. 3.

In the above description, the second camera module 121-2 and the like are disposed on the second body 100B. Other configurations and arrangements may also be provided.

One or more of the elements 111-1, 121-2, 121-3, 152-2 that are disposed on the second rear case 100B-2 may be mounted on the first body 100A such as on the first rear case 100A-2. Elements disposed on the first rear case 100A-2 may be protectively covered by the second body 100B when the portable terminal is in the closed configuration. In addition, even if the second camera module 121-2 is not separately mounted, the first camera module 121-1 may be configured to rotate to thereby enable image capturing up to the image capturing direction of the second camera module 121-2.

Figure 4:
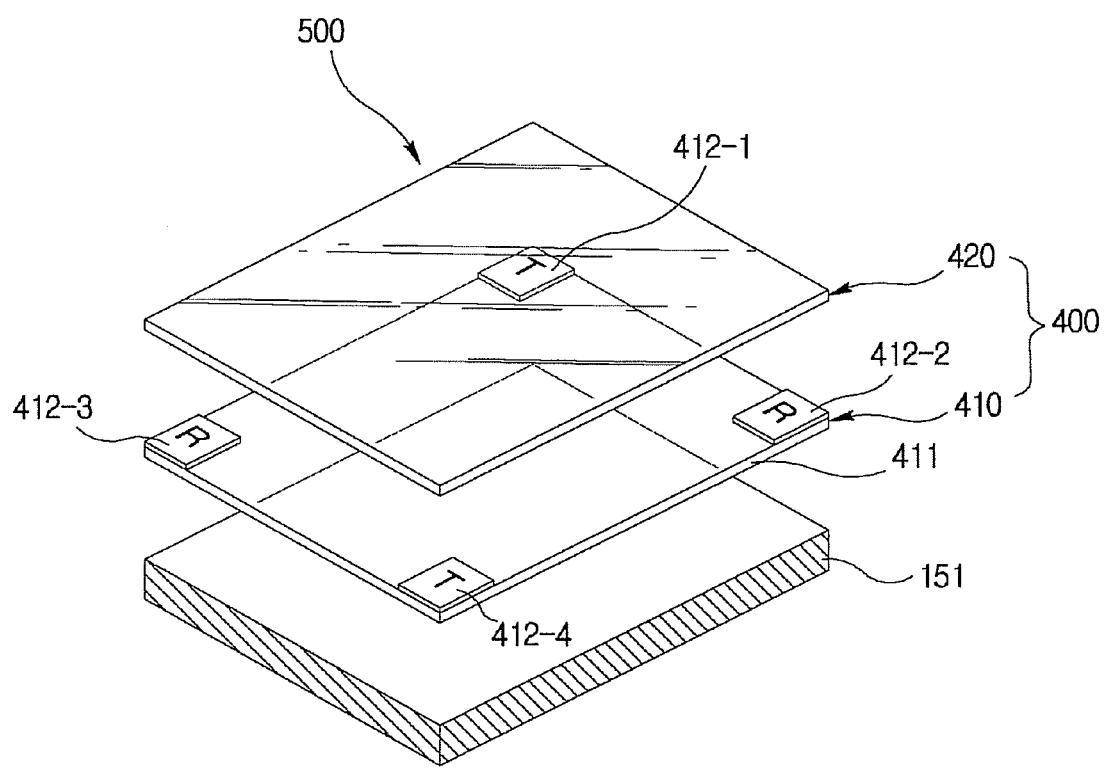
FIG. 4 is a drawing illustrating a structure of a touch screen according to an example arrangement.

FIG. 4 is a drawing illustrating a structure of a touch screen according to an example arrangement. Other arrangements may also be provided.

As shown in FIG. 4, the display module 151 may be overlaid (i.e., overlapped, superimposed, covered) on a touch panel 400 in a layered manner to operate as a touch screen.

The touch panel 400 shown in FIG. 4 may include a square conductive film 411 made of transparent conductive material such as Indium Tin Oxide (ITO) and metal electrodes 412-1 to 412-4 each formed at a edge of each conductive film 411. The conductive film 411 may be formed thereon with a protective film 420.

The touch panel 400, which is a position detection device (or input device) of capacitive sensing type, may be formed with electric field lines between transmission side metal electrodes 412-1 and 412-4 and reception side metal electrodes 412-2 and 412-3 by an alternating current (AC) voltage applied to the transmission side metal electrodes 412-1, 412-4. The formed electric field lines extend to outside of the touch panel 400 via the protective film 420.

When an object (e.g., digits of a user) comes near the touch panel 400 or directly touches the touch panel 400, the electric field lines may be partially interrupted to generate a change of phase and amplitude of current flowing to the reception side metal electrodes 412-2, 412-3. This is because the human body has a static capacity of several pFs relative to ground to distort the electric field lines formed on the touch panel 400 when a user has fingers near to or touching the touch panel 400.

Processes (not shown) formed inside the portable terminal 100 may use the current change of the reception side metal electrodes 412-2, 412-3 in response to touch operation of the object to detect a proximity of the object and a position where the touch has occurred. This may correspond to position information.

The object may include not only fingers of the user, but also objects capable of identifying a touch input by the portable terminal 100 by distorting the electric field lines formed on the touch pad 400. For example, the object may also include a stylus or other pointing device.

Figure 5:
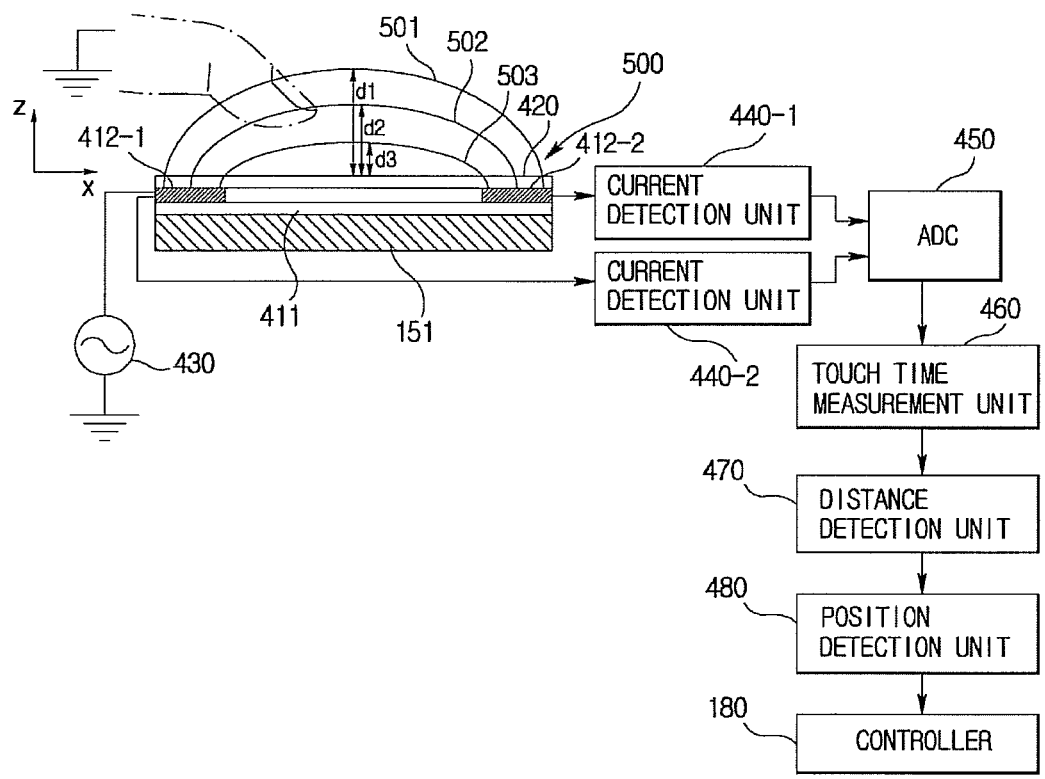
FIG. 5 is a drawing illustrating a principle for detecting a short distance of an object using the touch screen of FIG. 4.

FIG. 5 is a drawing illustrating a principle for detecting a short distance of an object using the touch screen of FIG. 4. Other arrangements may also be provided.

As shown in FIG. 5, application of an AC voltage 430 to the transmission side metal electrode 412-1 (from metal electrodes 412-1 to 412-4) formed on the transparent conductive film 411 may form electric field lines (i.e., electric lines of force 501 to 503) between the transmission side metal electrode 412-1 and the reception side metal electrode 412-2. The electric field lines 501 to 503 may be extensively formed to a vertical upward direction (i.e., a z direction) of a touch screen 500.

The amount of electric field lines 501 to 503 interrupted by a finger 510 may be changed based on proximity to the touch screen 500 by the finger 510 of the user. In other words, as the hand nears the touch screen 500, the finger 510 may increase influence applied to the electric field lines 501 to 503.

The influence applied to the electric field lines 501 to 503 by the finger 510 may change the current applied to current detection units 440-1, 440-2 connected to the metal electrodes 412-1, 412-2, where the current detection units 440-1, 440-2 detect the changed current and provide the change to an Analog-to-Digital Converter (ADC) 450. The ADC 450 may convert the current amount inputted in the form of an analog signal to a digital value and provide the digital value to a touch time measurement unit 460.

The touch time measurement unit 460 may measure a time that the finger 510 stays within a touch identification effective distance (i.e., 'd1' of FIG. 5) capable of identifying proximity of the finger 510 by the touch screen 500 from information relative to the changed current amount provided by the ADC 450. The touch time measurement unit 460 may recognize that a proximity touch or a direct touch operation is being performed if the finger 510 stays beyond a predetermined time (i.e., 1 second) within the proximity touch identification effective distance (i.e., 'd1' of FIG. 5). If the finger 510 stays shorter than a predetermined time (i.e., 1 second) within the proximity touch identification effective distance (i.e., 'd1' of FIG. 5), the touch time measurement unit 460 may determine that a proximity touch or direct touch operation is not being performed.

If it is determined that there is a touch input in response to the proximity touch or direct touch operation relative to the touch screen 500, the touch time measurement unit 460 may provide information on touch input generation information and current change amount to a distance detection unit 470.

The distance detection unit 470 may calculate a distance between the finger 510 and the touch screen 500, i.e., a distance separated from the touch screen 500 by the finger 510 toward the vertical upward direction (i.e., z direction) from the information on the provided current change amount.

More specifically, if the finger 510 is positioned at a location nearer than d1 from the vertical direction of the touch panel 400 (i.e., z direction) but further than d2 (i.e., 20 mm, a location between d1 and d2), then the distance detection unit 470 may determine that the finger 510 has entered within the touch identification effective distance from which to detect whether the touch screen 500 starts to be touched by an external object, and may provide a function corresponding to the proximity touch operation. The proximity touch may be defined by a state of an object (i.e., a finger of a user or stylus) being positioned within the touch identification effective distance of the touch screen 500 for inputting a user command. The proximity touch of the object not directly touching the touch screen 500 may be distinguished from the direct touch operation that directly touches the touch screen 500 by the object.

If the finger 510 is positioned on a location closer than d2 (i.e., 20 mm) from the vertical direction of the touch panel 400 (i.e., the z direction) but further than d3 (i.e., 10 mm, a location between d2 and d3), then the distance detection unit 470 may determine that the finger 510 has fairly approached the touch screen 500. If the finger 510 is positioned on a location shorter than d3 (i.e., 10 mm) (i.e., positioned within d3) from the vertical direction of the touch panel 400 (i.e., the z direction) (i.e., positioned within d3) or the finger 510 has directly touched the surface of the touch screen 500, the distance detection unit 470 may determine that the finger 510 has directly touched the touch screen 500.

Although touch operation of the finger 510 have been described with respect to three distances between the finger 510 and the touch screen 500, the description of the touch operation may be classified in four distances (or other numbers) for further accuracy.

The position detection unit 480 may calculate, from information on a changed current amount, a position on the touch screen 500 indicated by the finger 510 (i.e., a horizontal coordinate of x and y directions on the touch screen 500). The y direction is a vertical direction relative to the x and z directions shown in FIG. 5.

The measured vertical distance between the finger 510 and the touch screen 500 and a horizontal coordinate of the finger 510 on the touch panel 400 may be transmitted to the controller 180. The controller 180 may determine the user command according to the vertical distance and the horizontal coordinate and perform a control operation in response to the user command and concurrently provide a predetermined graphic user interface (GUI).

Figure 6:
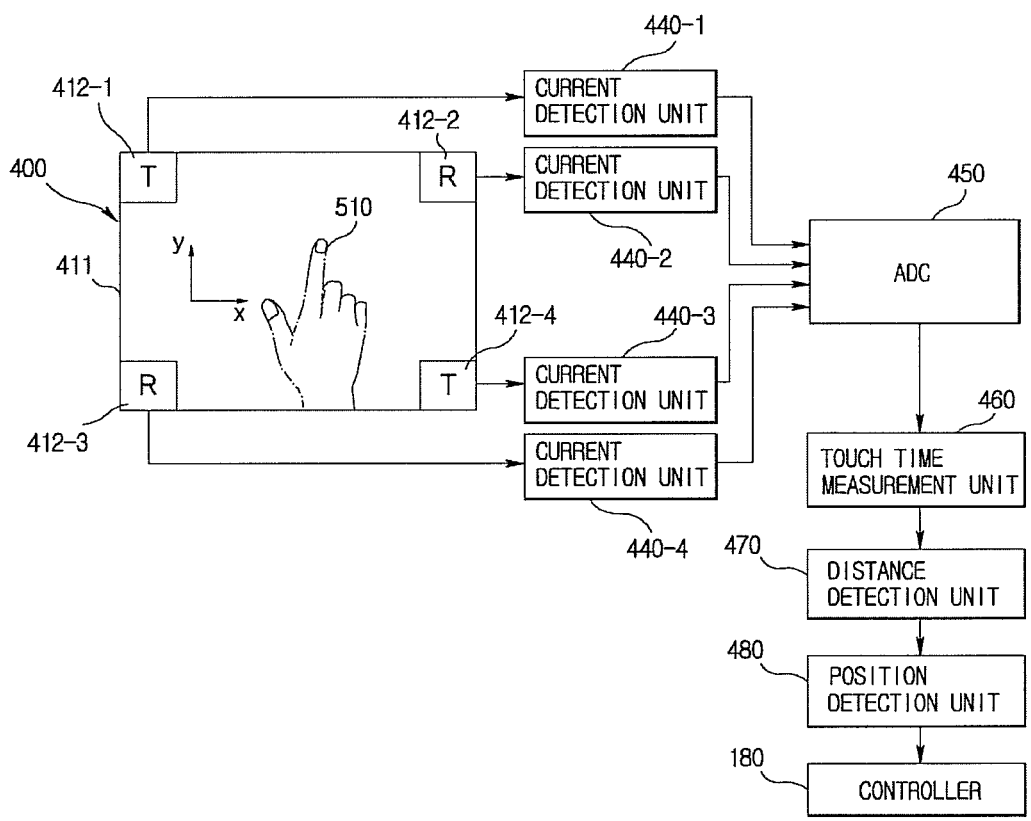
FIG. 6 is a drawing illustrating a position detection principle of an input medium or an object using the touch screen of FIG. 4.

FIG. 6 is a drawing illustrating a position detection principle of an input medium or object using the touch screen of FIG. 4. Other arrangements may also be provided.

When an AC voltage is applied from the AC voltage source to the transmission side metal electrodes 412-1, 412-4 of the touch panel 400, electric field lines (not shown) are formed between transmission side metal electrodes 412-1, 412-4 and the reception side metal electrode 412-2, 412-3.

In addition, if the finger 510 comes close to the touch panel 400 or directly touches the touch panel 400, current changes are generated to the metal electrodes 412-1 to 412-4. The current detection units 440-1 to 440-4 measure the current changes, and as described above, the position detection unit 480 detects the horizontal coordinate (i.e., the x-y coordinates) located on the touch panel 400 by the finger 510 via the current changes and provides the coordinates to the controller 180. The controller 180 recognizes the horizontal coordinate on the touch screen 500 touched by the finger 510 to perform the user command corresponding to the touch operation and provides the predetermined graphic user interface (GUI) onto the display module 151.

Although the touch time measurement unit 460, the distance detection unit 470 and the position detection unit 480 have been separately described according to their functions, the units 460, 470, 480 may also be formed inside the controller 180.

Although the touch screen 500 equipped with the touch panel 400 according to capacitance detection type has been shown in FIGS. 4, 5 and 6 to explain a principle of determining proximity touch and direct touch of an input medium relative to the touch screen 500, other arrangement shapes of the metal electrodes 412-1 to 412-4 of the touch panel 400 or types of touch panels 400 may be provided as long as a position may be detected by the input medium or object and the distance may be determined between the input medium and the touch screen 500.

For example, the touch panel 400 may detect a proximity position between the input medium (i.e., a finger or stylus) and the touch panel 400 using a photoelectric sensor that uses laser diodes and light emitting diodes, a high frequency oscillation proximity sensor and electromagnetic proximity sensor, for example. The touch panel 400 may also combine the capacitance detection type and the resistive sensing type by forming metal electrodes on an upper plate or a lower plate for detecting voltage changes according to a position determined by the input medium. The input medium may be a pointing device to provide information to an input device.

Methods relating to an instant messenger service in a portable terminal are disclosed in Korea Laid-Open Patent No. 10-2007-0042130 and other patents, the subject matters of which are incorporated herein by reference. As such, a detailed explanation may be omitted.

The portable terminal according to an example embodiment may include a vibration generation unit 154 for vibrating the portable terminal, and a controller 180 for converting status information of a messenger program or a member (an opponent) relative to the messenger program to vibration patterns while performing the messenger program, and the controller 180 may control operations of the vibration generation unit 154 in response to the vibration pattern.

The portable terminal may include an input device (such as a touch screen, a touch pad or a track ball) shown in FIGS. 4-6 for receiving pointing information relative to the messenger program. The pointing information may be a specific location on a display screen that is determined using the touch screen, the touch pad or the track ball, for example.

A vibration generation unit may include a vibrator for mechanically vibrating the portable terminal. The vibrator may be selected from various products having an appropriate size and performance and suitable for use inside the portable terminal.

The vibrator may receive a turn-on electric potential as a driving power, or a clock type signal. The turn-on electric potential may reduce cost for implementation but may be problematic due to difficulty in transmitting complex information. The clock type signal may have difficulty in implementation and require costly parts but may have an advantage in that a number of vibration patterns generated by the vibration generation unit may be increased to enable transmission of complex information. The clock type signal may have another advantage in that clock frequency may be adjusted to control a vibration frequency of the vibrator.

The vibration generation unit may include two or more vibrators. Two or more vibrators may make it possible to implement a variety of applications. For example, two or more vibrators each having a different intrinsic vibration frequency may allow a user to discern a response difference using the frequency difference. Two or more vibrators each having a different vibration direction and/or location may allow a user to discern the response difference using the vibration direction that is felt when the user holds the portable terminal and/or based on vibration location.

A predetermined area allocated to the storage 160 of the portable terminal may store data such as database for supporting the messenger program of the portable terminal. For example, the storage 160 of FIG. 1 may be formed with a status information-vibration pattern database having records in which one field provides information of a plurality of status information while another field provided information of vibration patterns.

Figure 7:
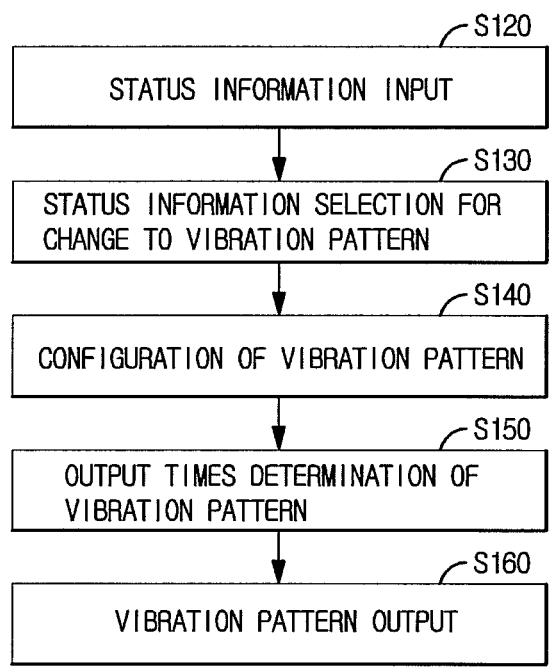
FIG. 7 is a flowchart illustrating a driving method of a messenger program in a portable terminal according to an exemplary embodiment of the present invention.

FIG. 7 is a flowchart illustrating a driving method of a messenger program in a portable terminal according to an exemplary embodiment of the present invention. Other embodiments and configurations are also within the scope of the present invention.

The driving method of a messenger program in a portable terminal may include receiving status information in S120 of a messenger program under execution in the portable terminal or status information of a member (an opponent) relative to the messenger program. The method may also include determining a vibration pattern in S140 in response to receiving the status information, and vibrating the portable terminal in S160 in response to the determined vibration pattern.

The method may further include setting up status information in response to a member's instruction in the messenger program of the member prior to S120 in consideration of the member side communicating with the messenger program.

The status information of the member in S120 may include any status information on the member's messenger program side. For example, the status information may be status information of the member's messenger program itself communicating with the messenger program, messenger use status information of the member, position information of a portable terminal or a personal computer on which the messenger program of the member is being executed, and/or a user's own basic information (i.e., information indicative of a user's feeling) displayed on his or her own messenger program.

An identifier of a member whose status information has been changed may be checked to change the identifier to a vibration pattern, or a messenger group identifier including a member whose status information has been changed may be checked, or the messenger group identifier may be changed to the vibration pattern.

The method may also include determining in S150 a number of outputs (hereinafter referred to as output number) of the determined vibration pattern. This may include a process of checking by a user of a predetermined output number relative to each circumstance. A one time output or a predetermined output number may be performed relative to the vibration pattern.

The method may also include selecting status information in S130 to be changed to the vibration pattern based on two or more items of status information. The selecting may perform an operation of reading out a predetermined user instruction or an operation of receiving the user instruction whenever the vibration pattern is outputted.

Figure 8:
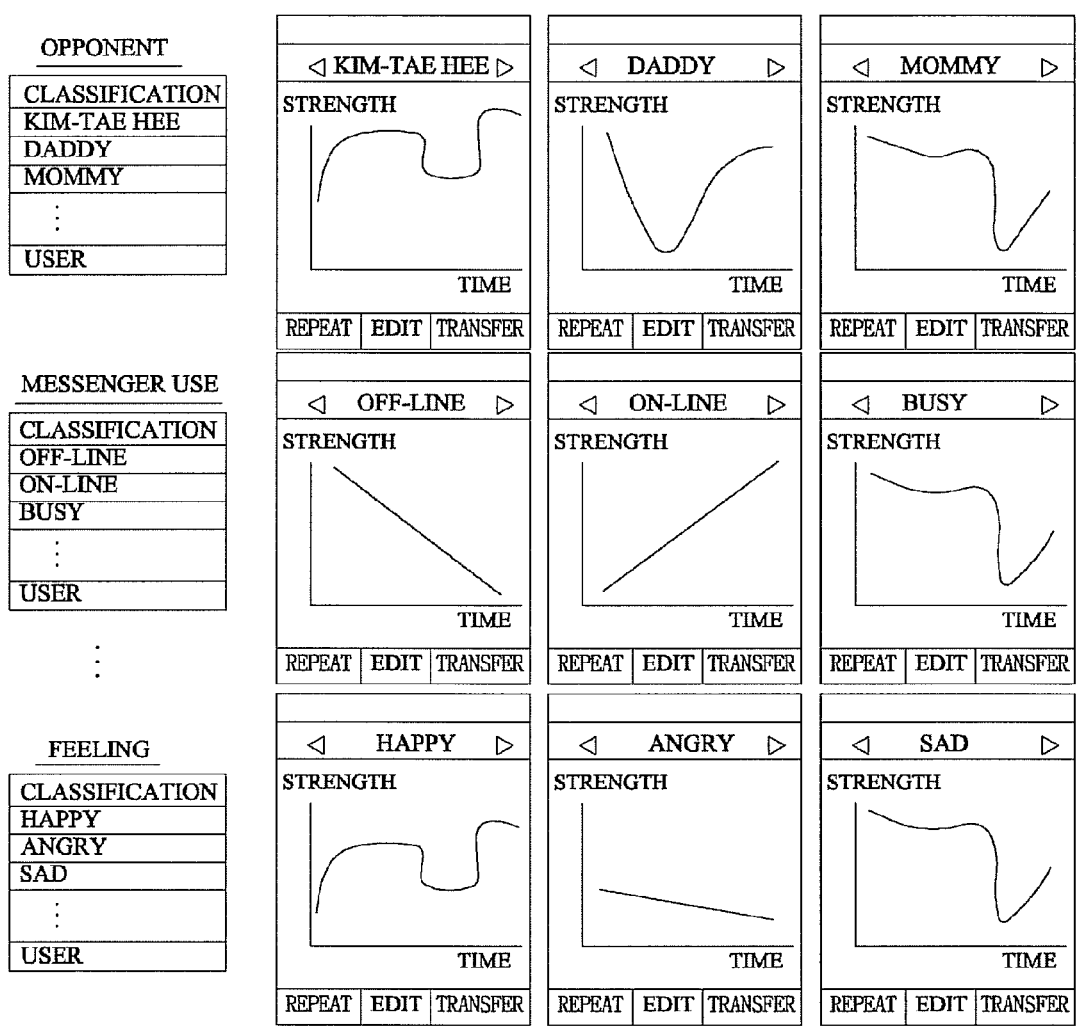
FIG. 8 is a drawing illustrating graphs that are provided with respectively distinguishable vibration patterns relative to a plurality of items for each type of status information.

For example, an implementation may be performed such that when the user points to (touches) a member name in a chat room window to change position information of the member to a vibration pattern and to point to (touch) the member's icon (avatar, photo), feeling information (such as shown in FIG. 8) indicated by the member may be changed to another vibration pattern.

The portable terminal may receive at least two or more mutually different status information in S120, and each combination of at least two or more items of mutually different types of status information may be changed to identifiable vibration pattern in S140.

FIG. 8 is a drawing illustrating graphs that are provided with respectively distinguishable vibration patterns relative to a plurality of items for each type of status information. Other graphs may also be provided.

As shown in FIG. 8, when mutually different vibration patterns for each item are provided, a combination may be made by coupling a vibration pattern selected from the member's item, a vibration pattern selected from the messenger use status item and still another vibration pattern selected from the feeling item.

In FIG. 8, the first row of graphs represents different members (or persons) such as Kim-Tae Hee, Daddy and Mommy. The second row of graphs represents different messenger use status such as Off-line, On-line or busy. The third row of graphs represents different feelings such as Happy, Angry and Sad. Vibration information from each of these rows may be combined into a vibration pattern over time.

Figure 9:
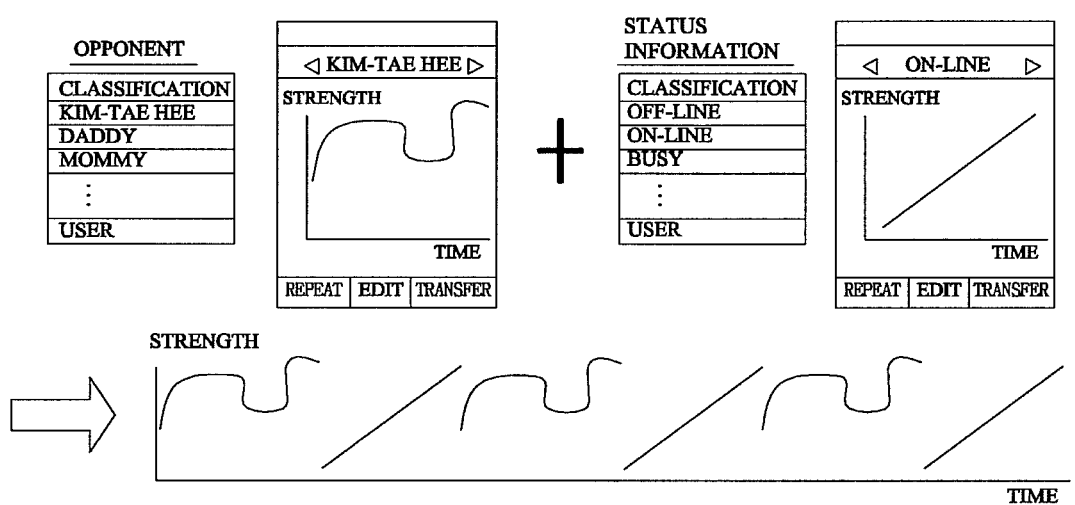
FIG. 9 is a drawing illustrating an output vibration pattern determined by changes of a member and/or a messenger use status.

FIG. 9 is a drawing illustrating an output vibration pattern in which a member's name and an item of messenger use status are coupled together. In the output vibration pattern, a vibration pattern identifying the member and a vibration pattern identifying the member's messenger use status may be combined. FIG. 9 shows that the combined pattern may be repeatedly outputted, such as for at least three times. In FIG. 9, the registered member Kim-Tae Hee is changed from Off-line status to On-line status.

When output times of vibration patterns are respectively differently provided relative to each combination of at least two mutually different types of status information, output times (the times of outputs) relative to items of each vibration pattern comprising the above combination may be defined by the following Equations.

$$Y=(A+B+\ldots+N)\times R, \quad \text{[Equation 1]}$$

where A, B, . . . , N are mutually different types of status information, and R is a number of repetitions.

$$Y=(A\times R1)+(B\times R2)+\ldots+(N\times Rn), \quad \text{[Equation 2]}$$

where A, B, . . . , N are mutually different types of status information, and R1, R2, . . . Rn are numbers of repetition.

In the above Equations 1 and 2, A may be information identifying a member party, B may be group information belonging to the member, C may be messenger use status information of the member, and D may be position information of the member's portable terminal.

Figure 10:
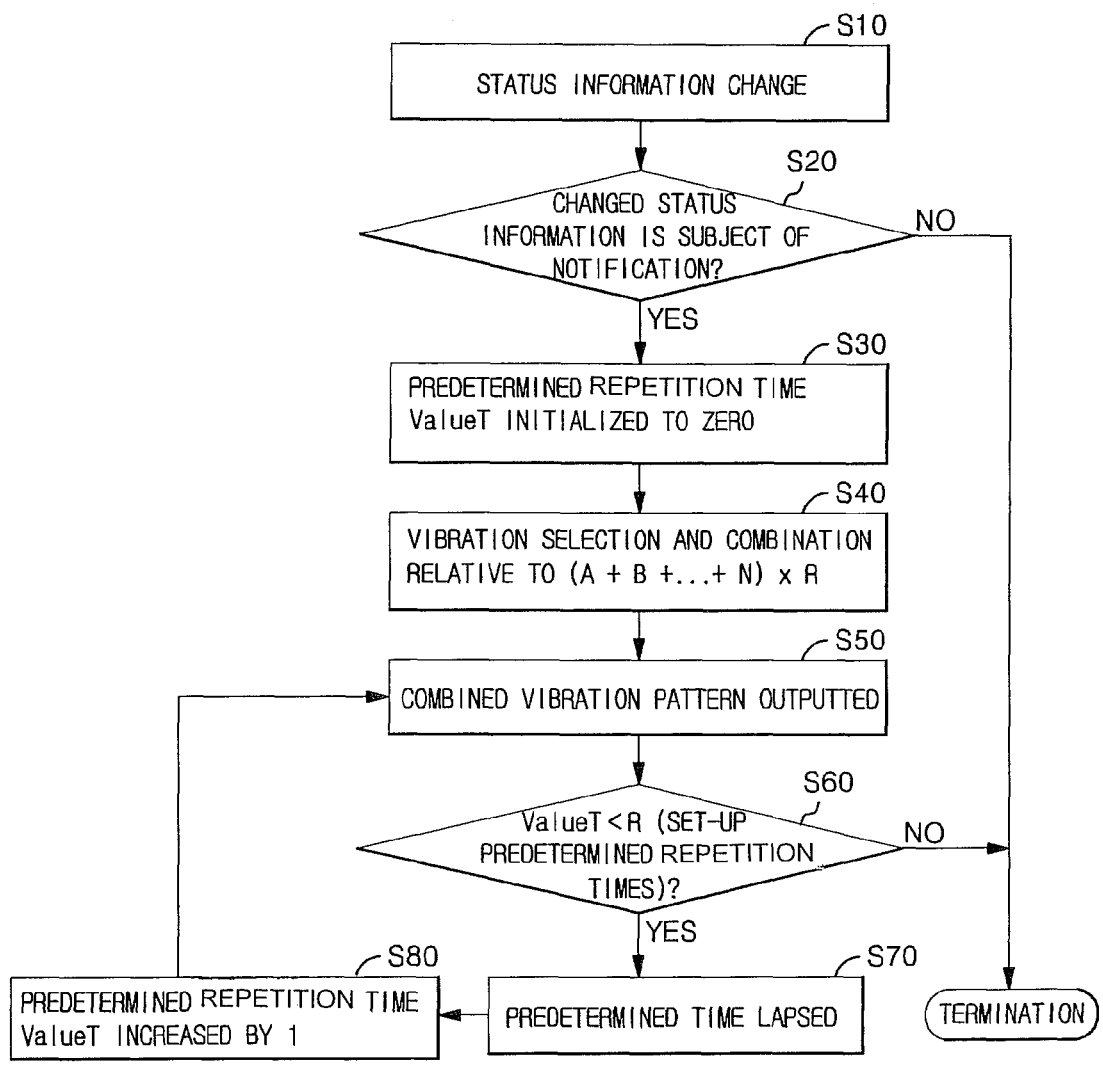
FIG. 10 is a flowchart illustrating a process of outputting a vibration pattern by determining the vibration pattern according to Equation 1.

FIG. 10 is a flowchart illustrating a process of outputting a vibration pattern in response to driving of a messenger program in a portable terminal according to Equation 1.

If an event occurs in which status information (under execution of the messenger program) is changed in S10, a determination is made in S20 whether the changed status information is subject to notification. If so, then a ValueT flag indicative of a number of outputs of vibration patterns is initialized to zero in S30.

A combination of vibration patterns as described with respect to Equation 1 may be determined in S40, and the combination may be outputted in S50.

Following the output of the vibration pattern in S50 a determination may be made in S60 whether the ValueT flag is less than the R value of Equation 1. If the ValueT flag is determined to not be less than the R value of Equation 1, then output of the vibration pattern may be terminated. If the ValueT flag is determined to be less than the R value of Equation 1, then a predetermined delay time may be provided in S70 and the ValueT flag may be increased by 1 in S80. Operation may then return to S50 to again output a relevant vibration pattern combination.

Figure 11:
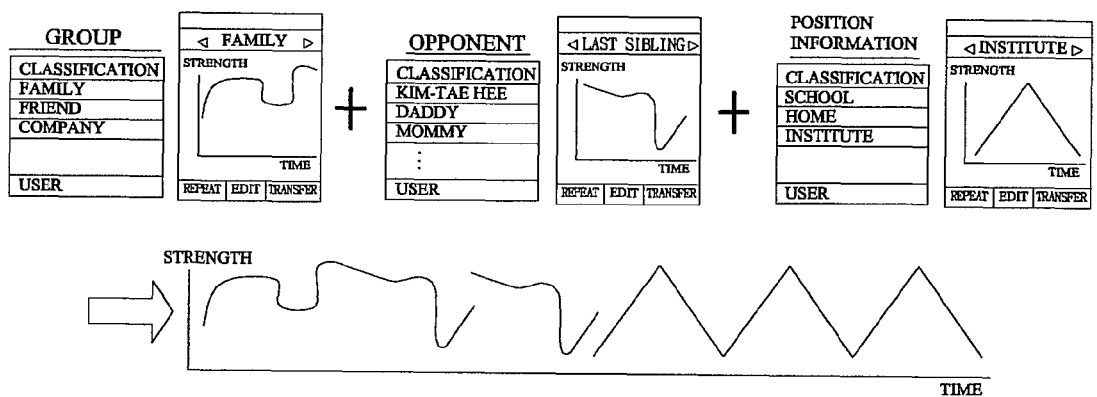
FIG. 11 is a drawing illustrating an output of a vibration pattern determined by changes of a member, a group and/or position information.

FIG. 11 is a drawing illustrating an output of a vibration pattern determined by a group, a member and/or position information. Different numbers of outputs for each item in a portable terminal may be applied with Equation 2. In FIG. 11, a "last sibling" of "family group" may change position from "Seoul Chongro" (school) to "Seoul Myungdon" (institute).

Figure 12A:
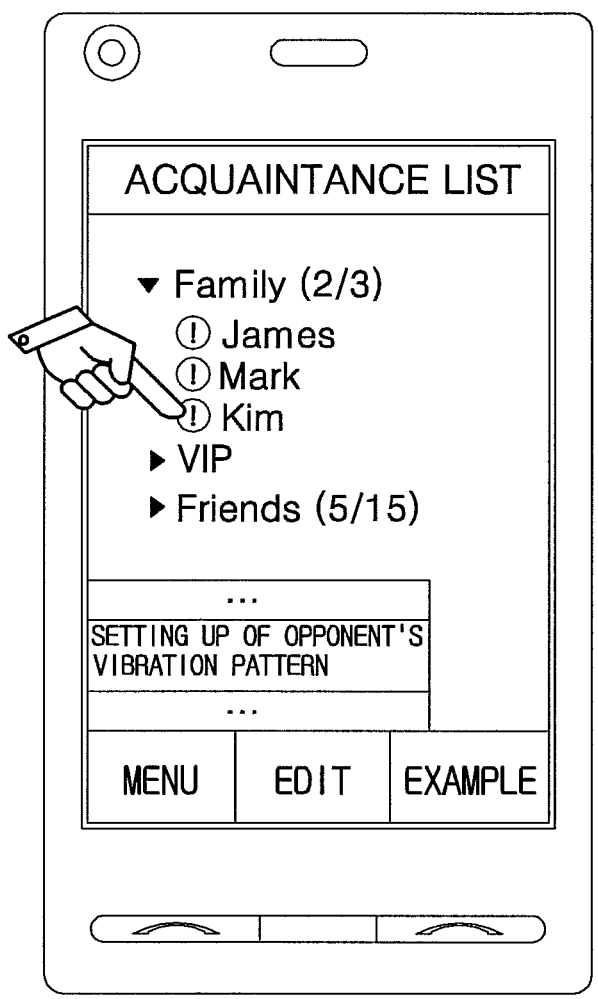
FIGS. 12A and 12B are drawings illustrating a process of setting up different vibration patterns for each user.
Figure 12B:
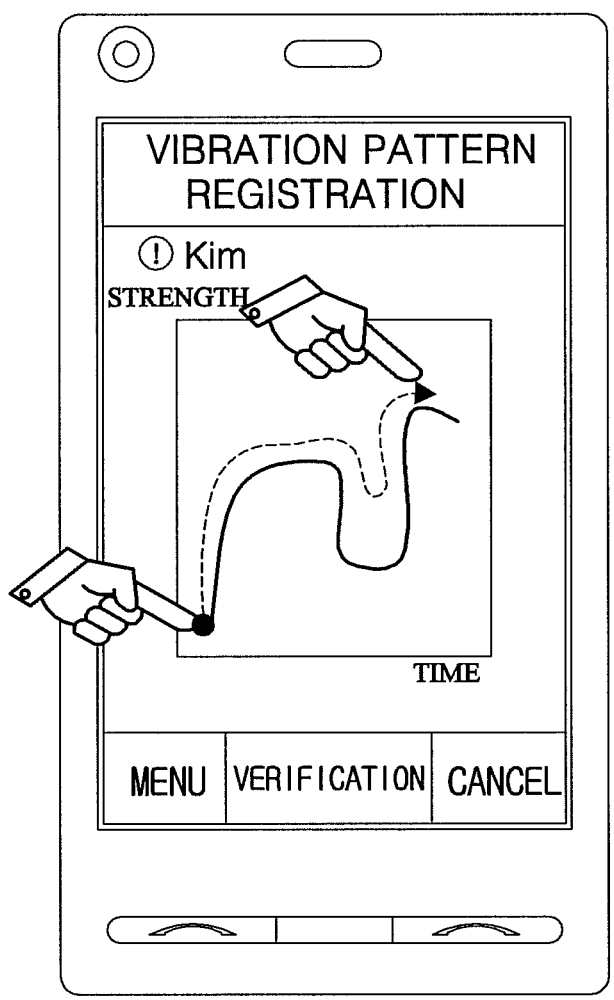

FIGS. 12A and 12B are drawings illustrating a process of setting up different vibration patterns for each user.

A user may register a vibration pattern for a member using a touch screen (or other input device) based on a telephone directory list. The portable terminal may display a vibration pattern registration screen as shown in FIG. 12B. The user may form a desired vibration pattern using a touch screen (or other input device) on the vibration pattern registration screen.

For example, if the portable terminal includes a touch screen (or a touch pad), and if a vibration pattern setting-up menu is executed, a 2-D (two-dimensional) coordinate space may be displayed on the portable terminal in which a longitudinal axis represents intensity and a crosswise axis represents time. A user may designate a desired vibration pattern on the displayed 2D coordinate space by moving an object (a pointing device such as a finger or a stylus) over the touch screen, the portable terminal may store the desired vibration pattern as a user-designated vibration pattern.

A portable terminal having a touch screen (or a touch pad) may set up a vibration pattern by directly inputting a user-desired vibration pattern via the touch screen (or via a touch pad or a track ball). A portable terminal with buttons or keys may receive the vibration pattern using a navigation key and keys capable of displaying up/down and left/right directions.

Although each vibration pattern may be identified by an intensity (amplitude) pattern over a predetermined period of time, a vibration frequency may have a shape that includes a predetermined pattern for a predetermined period of time, depending on implementations. Identification may be made by a delay time before start of the vibration or a different time interval from among a plurality of vibrations.

A portable terminal capable of receiving a user-desired vibration pattern may compare the user-desired vibration pattern with previously-stored vibration patterns. If the user desired vibration pattern is very similar to a previously-stored vibration pattern (by tactile sensation), then the portable terminal may inform the user of this situation. Another vibration pattern may be proposed to or may be provided by the user. For example, the display may show which part of the vibration pattern that is to be added and/or desired by the user to be changed in order to distinguish the new pattern from the previously registered vibration patterns.

Figure 13A:
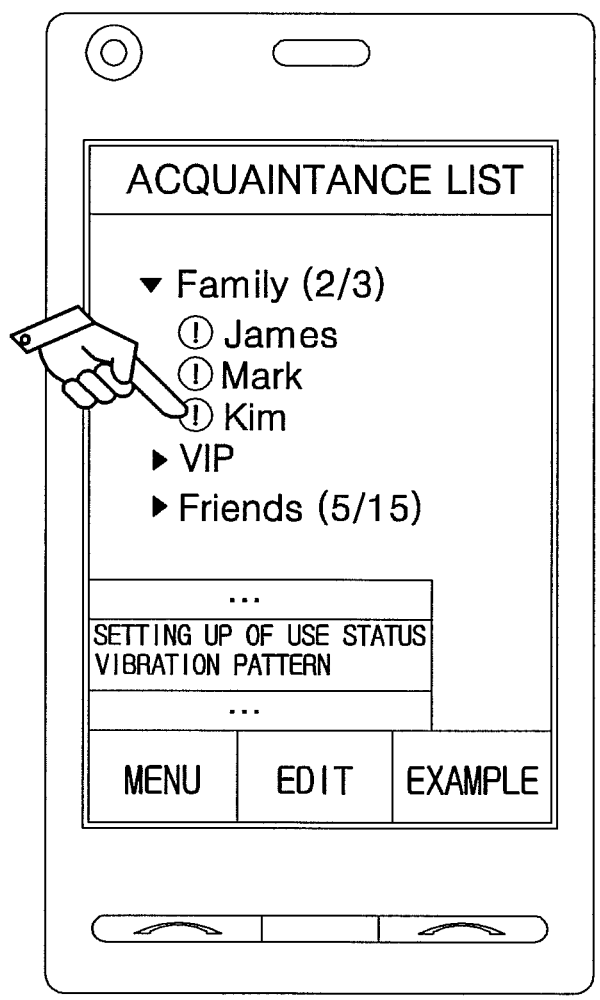
FIGS. 13A and 13B are drawings illustrating a process of setting up different vibration patterns for each messenger use status.
Figure 13B:
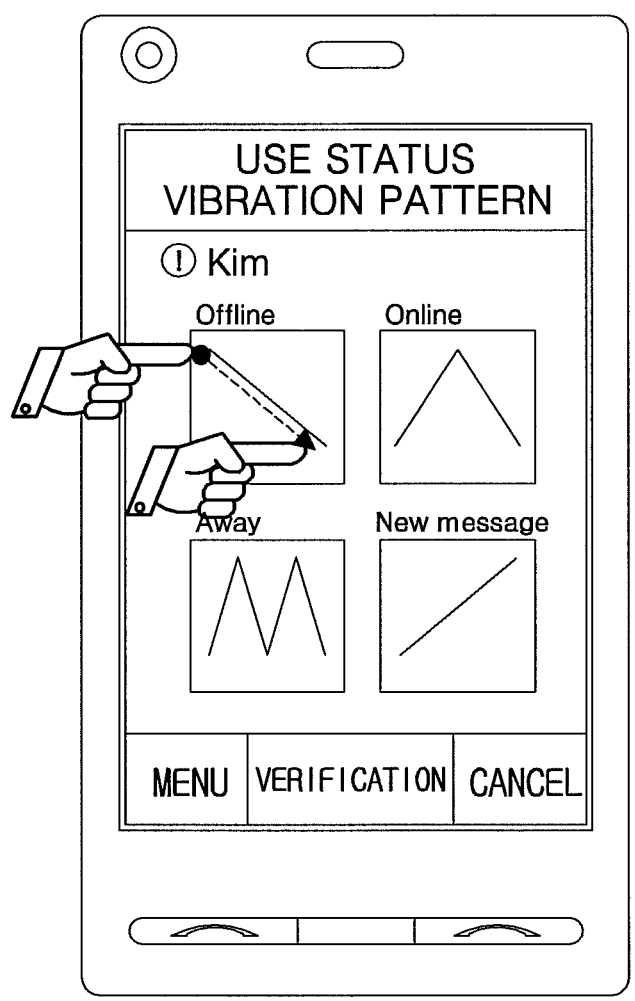

FIGS. 13A and 13B are drawings illustrating a process of setting up different vibration patterns for respective messenger use status according to an exemplary embodiment. Other embodiments and configurations are also within the scope of the present invention. The messenger use status may be one of Offline, Online, Away and/or New message. The messenger use status may include log-on/out, away and busy, for example.

When one of respective messenger use status items is selected using a touch screen from an acquaintance list screen (FIG. 13A) or a screen of a telephone directory list, the portable terminal may display a registration screen relating to the vibration pattern identifying the messenger use status as shown in FIG. 13B. The user may form or select the desired vibration pattern using the touch screen (or other input device) on the vibration pattern registration screen.

Figure 14A:
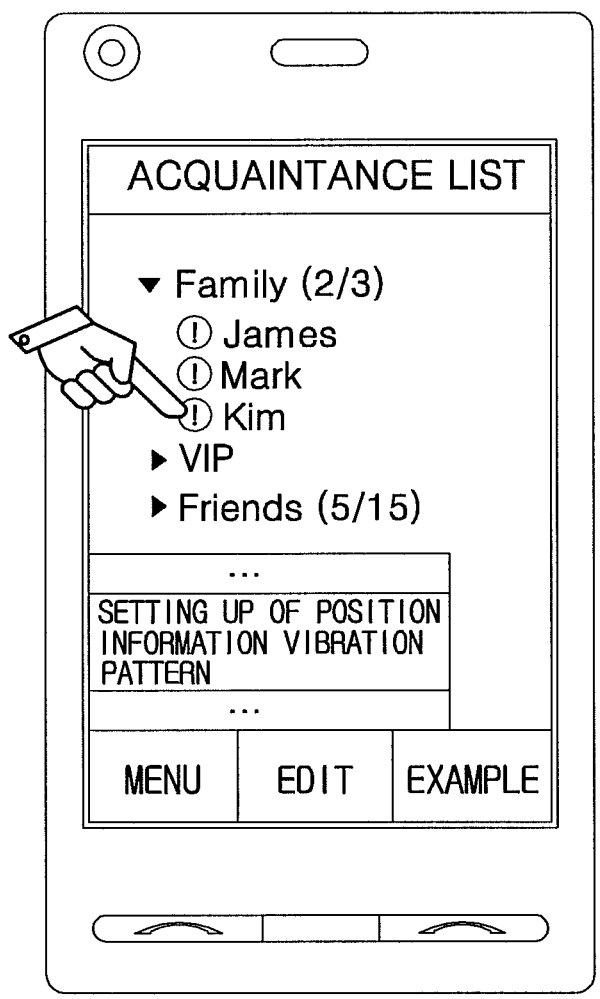
FIGS. 14A and 14B are drawings illustrating a process of setting up different vibration patterns for different position information.
Figure 14B:
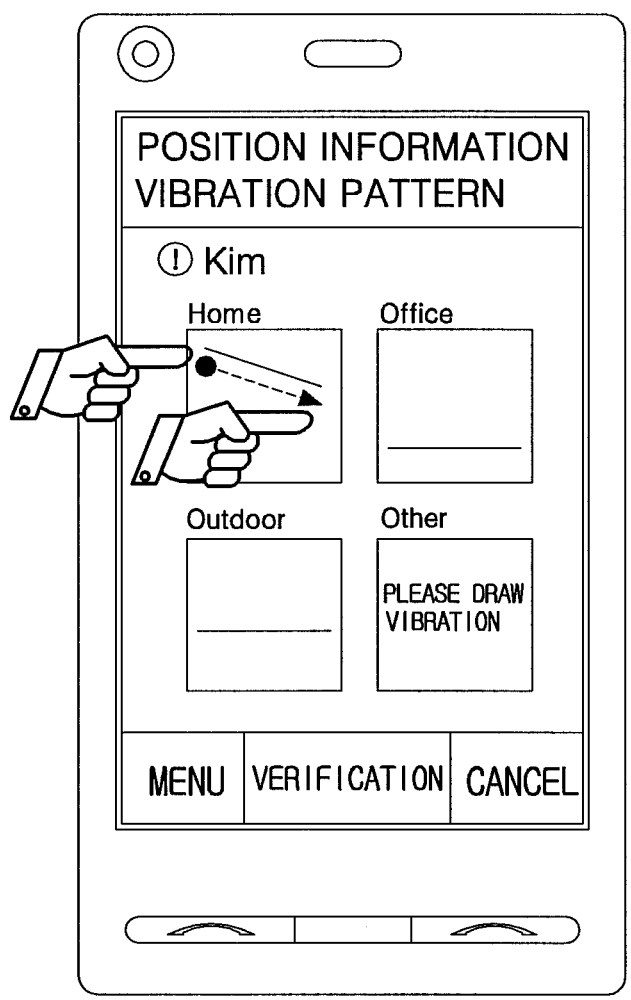

FIGS. 14A and 14B are drawings illustrating a registration process of a vibration pattern identifying position information of a member in a portable terminal according to an exemplary embodiment. Other embodiments and configurations are also within the scope of the present invention. The position information may include Home, Office, Outdoor, Other, for example.

When one of a plurality of respective position information to be registered by the user for a vibration pattern is selected using a touch screen from an acquaintance list screen (FIG. 14A) or a screen of telephone directory list, the portable terminal may display a registration screen relating to the vibration pattern identifying the position as shown in FIG. 14B. The user may form or select the desired vibration pattern using the touch screen (or other input device) on the vibration pattern registration screen.

A variety of methods other than the illustrated method for forming the vibration pattern may be utilized. For example, a user may select desired vibration pattern samples from a sample storage (in a storage device at the portable terminal or in a server of a communication network) that stores samples relating to a plurality of vibration patterns. Each parameter for determining the vibration patterns may be directly inputted via key manipulation.

Although the above drawings have shown vibration patterns as patterns over a time axis and a vibration amplitude axis, a vibration frequency, a delay time before start of vibration and a delay time among a plurality of vibrations may also be applied as parameters for regulating the vibration patterns.

Figure 15A:
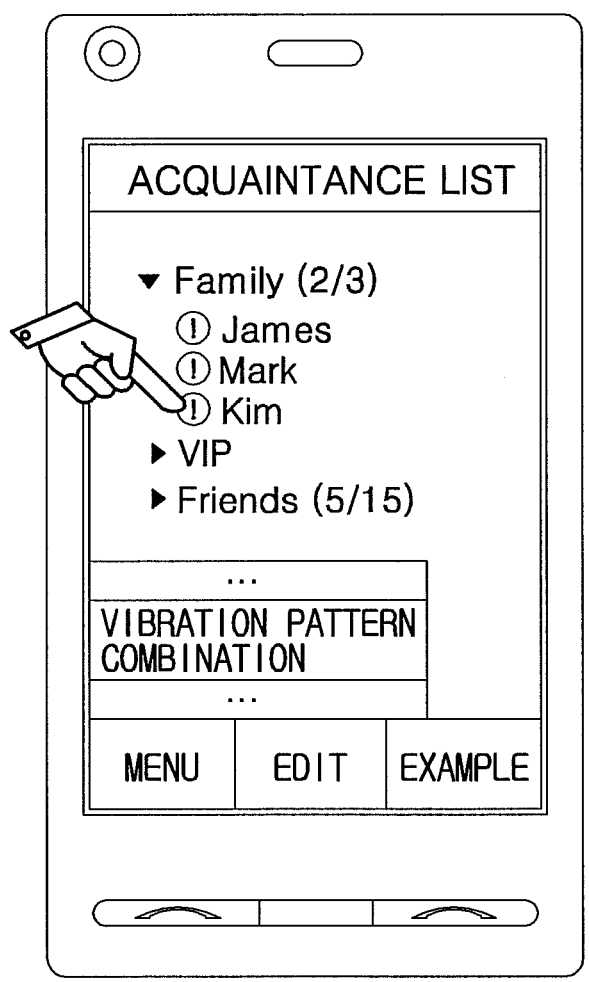
FIGS. 15A and 15B are drawings illustrating a process of setting up an output order of vibration patterns relative to mutually different items.
Figure 15B:
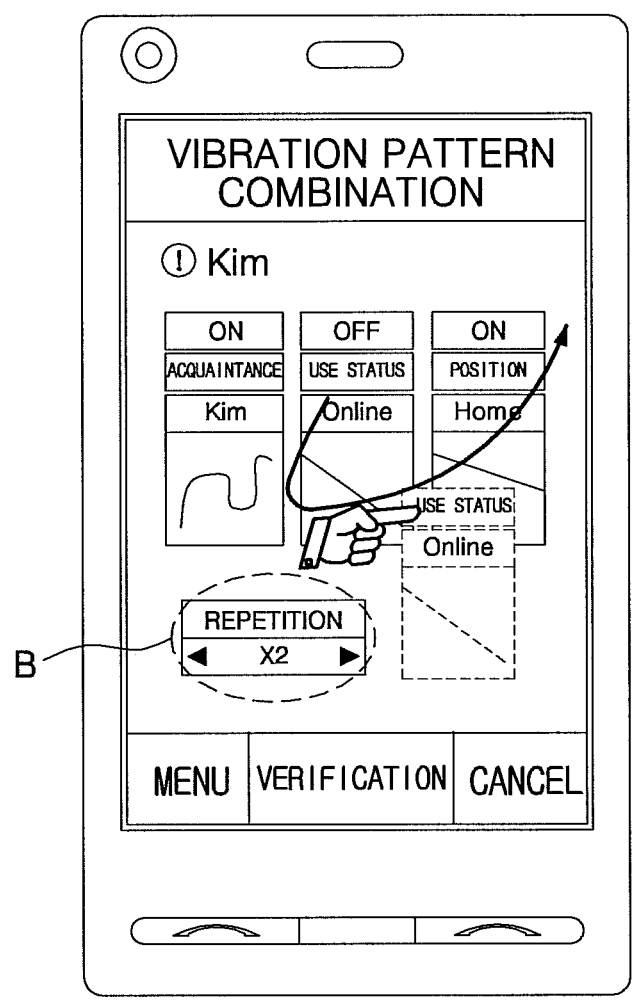

FIGS. 15A and 15B are drawings illustrating a screen on which a process of setting up a combination of vibration patterns according to messenger use status, a particular user and position information.

When an acquaintance who will edit vibration patterns on a messenger acquaintance list screen is selected in FIG. 15A, items of each vibration pattern may be touched by a user or a pointing device and the item may be drag-and-dropped as shown in FIG. 15B to determine an order of each vibration pattern item within one vibration pattern combination. A number of repetitions for each vibration pattern item may be designated using a repetition number setting-up button (B) as shown in FIG. 15B.

Figure 16A:
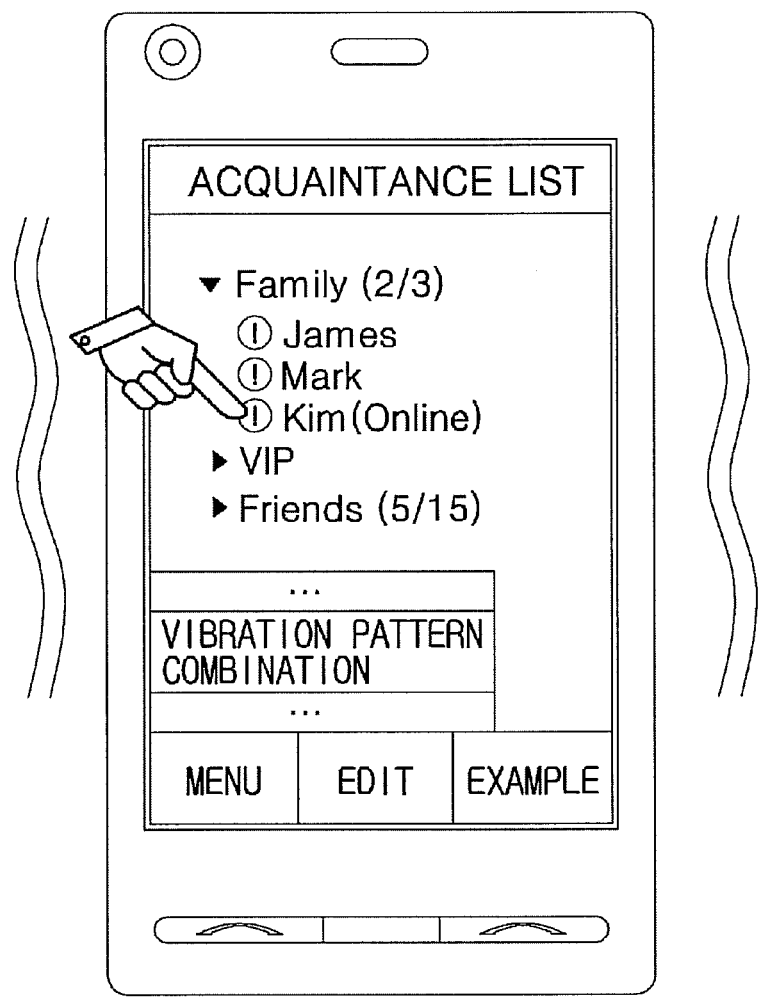
FIGS. 16A and 16B are drawings illustrating an output of a vibration pattern in response to changes of messenger use status of a member designated by a user and changes of the use status.
Figure 16A:
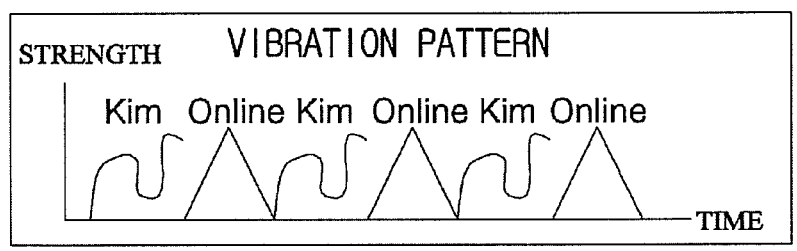
Figure 16B:
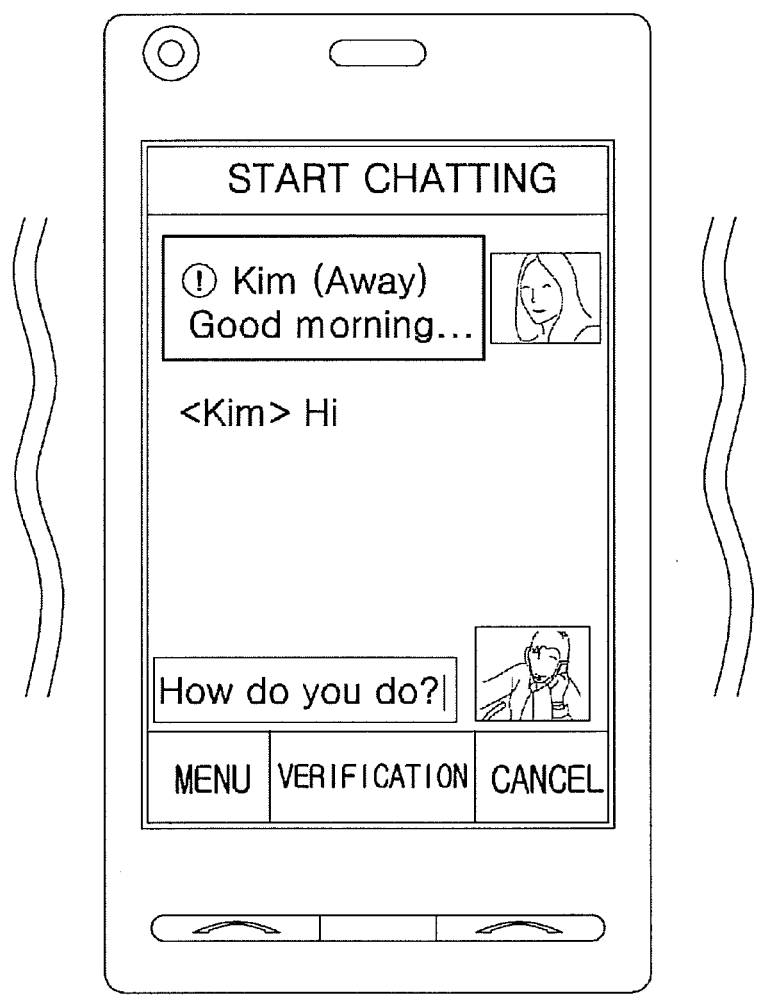
Figure 16B:
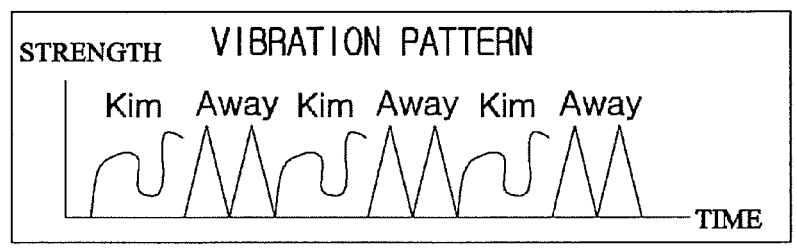

FIGS. 16A and 16B are drawings illustrating a screen on which status information of a member instructed by a user of a portable terminal is notified via a vibration pattern according to an exemplary embodiment. Other embodiments and configurations are also within the scope of the present invention.

When a particular member is designated using a touch screen (or other input device) on an acquaintance list screen such as FIG. 16A, information of messenger use status of a designated member may be outputted via a vibration pattern. When an icon (avatar or photo) of a chatting member is touched on a chatting box window as shown in FIG. 16B, information or the messenger use status may be outputted via a vibration pattern.

Figure 17A:
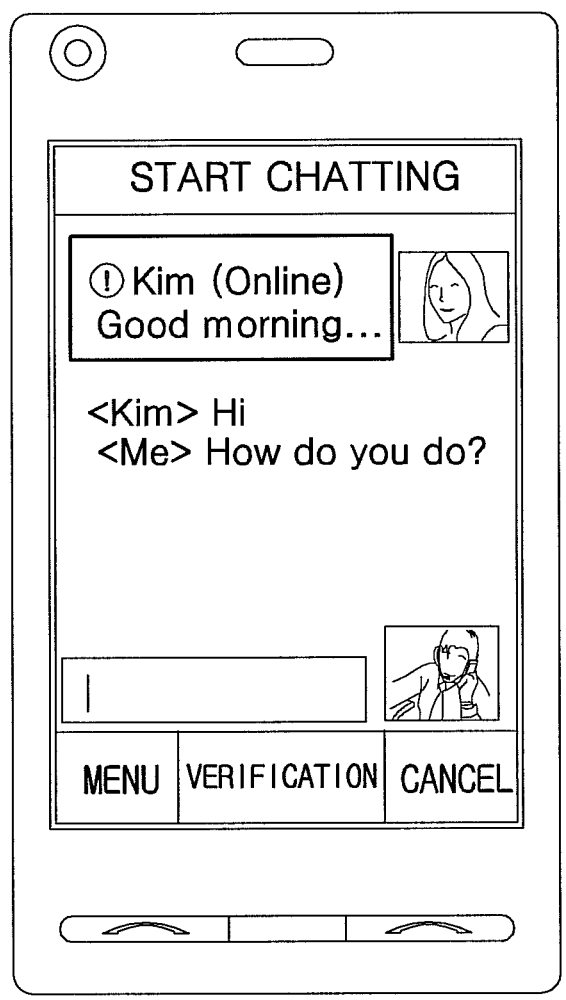
FIGS. 17A and 17B are drawings illustrating an output of a vibration pattern in response to changes of messenger use status of a member who is chatting and then changes use status.
Figure 17B:
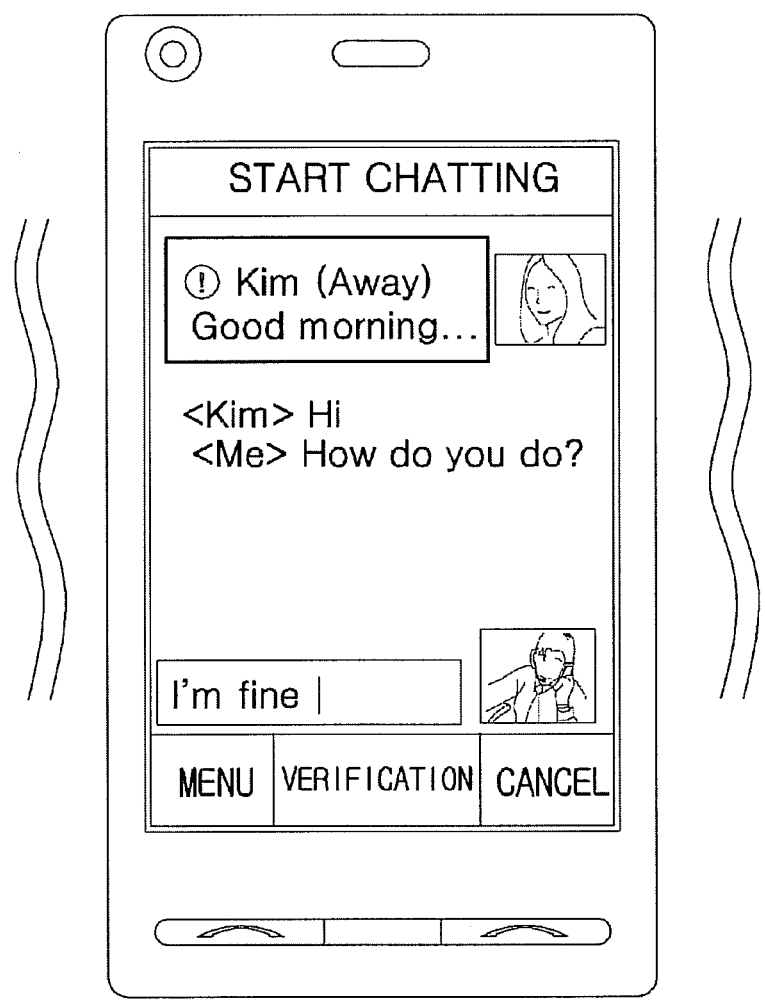
Figure 17B:
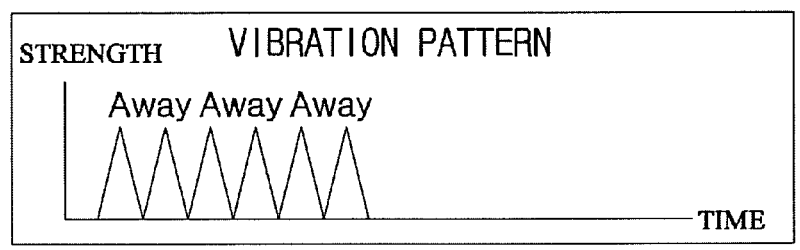

FIGS. 17A and 17B are drawings illustrating a notification to a user of a portable terminal by way of a vibration when there is a change of messenger use status of a member during messenger chatting or a change of position information.

When a member in a chatting window (FIG. 17A) moves away from the chatting window (FIG. 17B), absence of the member may be notified via a vibration pattern. When there is a change of position information of the member, the change of the member may also be notified via a vibration pattern.

Figure 18A:
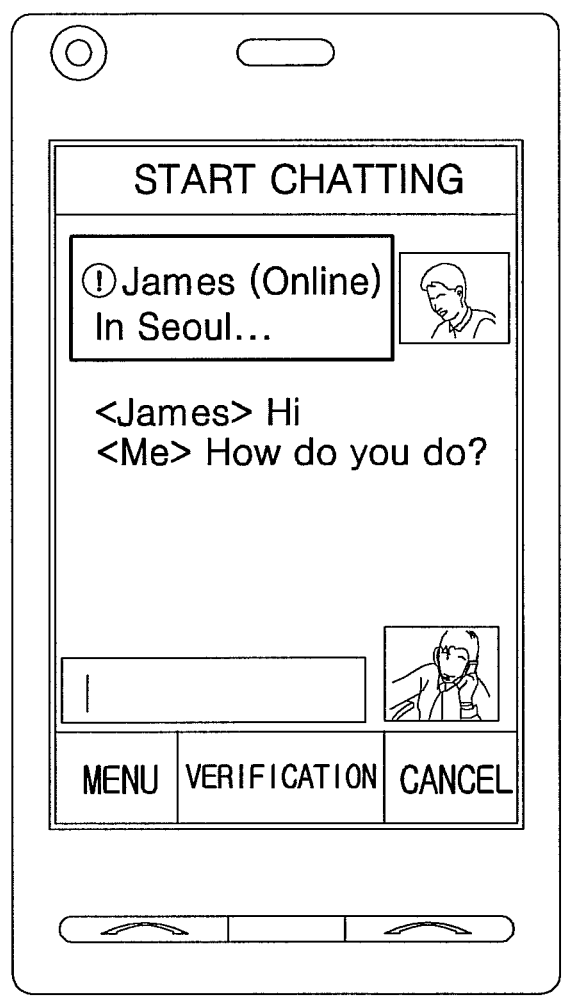
FIGS. 18A and 18B are drawings illustrating an output of vibration patterns in response to changes of messenger use status of a member who is not chatting and then changes use status.
Figure 18B:
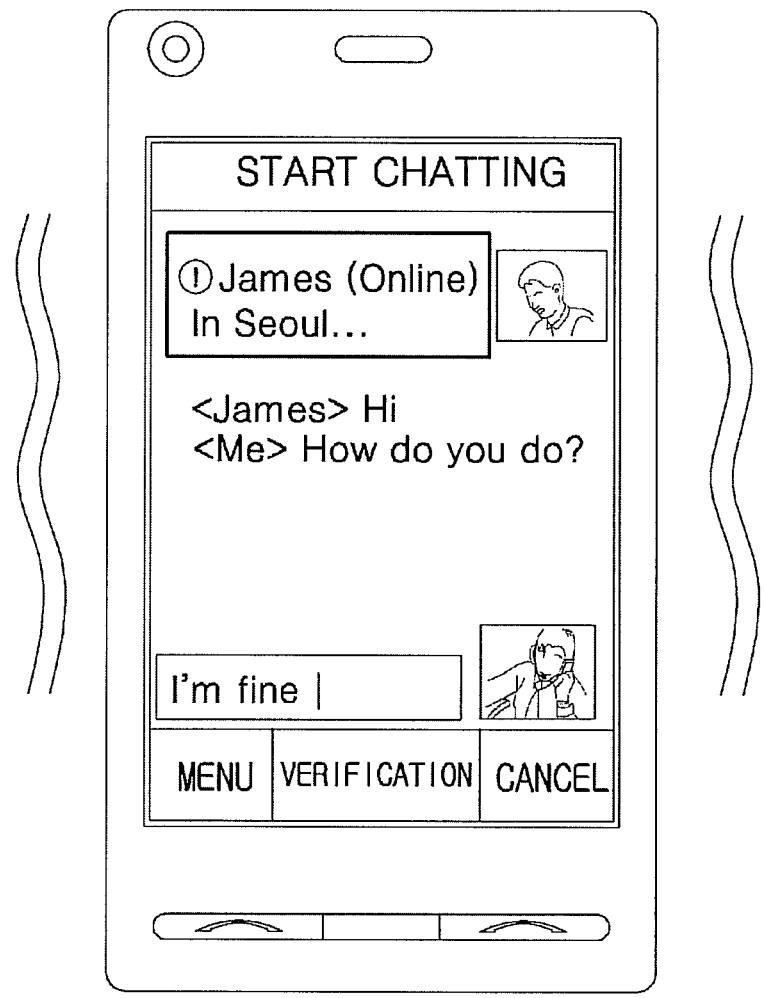
Figure 18B:
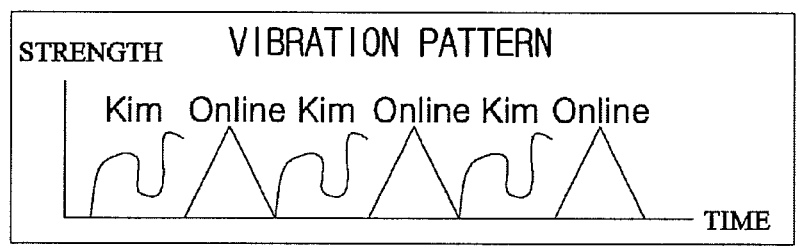

FIGS. 18A and 18B are drawings illustrating a notification to a user of a portable terminal via vibration when there is a change of messenger use status and position of another member (other than a member who is conducting a current chatting during messenger chatting).

When another member logs on (to a chatting window) as shown in FIG. 18B while chatting with a member in the chatting window as shown in FIG. 18A, a vibration pattern may be outputted showing the log-on by combining a vibration of the newly logged-on member with a vibration of messenger use status. A combination of a vibration patterns relating to changed status information with a vibration pattern identifying a member whose status information has been changed can be made during chatting with multiple members.

The above-described portable terminal providing messenger service using vibration patterns is not limited in its application, construction and arrangement of elements to the above-described embodiments and/or arrangements. Rather, various changes are possible without departing from the principles set forth herein. All or part of each implementation maybe selectively combined to carry out various alternate forms.

For example, although the present disclosure has described the service called messenger as an instant messenger service, the service may be applied to other services capable of conducting a long intermittent chatting by grouping chatting-desired members in particular chatting formats using a common communication network such as the Internet.

Embodiments of the present invention may provide a driving method of a messenger program in a portable terminal mounted with interface means by way of motion and/or a tactile feeling. Embodiments may provide a portable terminal capable of performing a messenger service by way of interface means using motion and/or tactile sensation.

A portable terminal may be provided that includes vibration generation unit for vibrating the portable terminal, and a controller for changing status information of a messenger program or a member (an opponent) relative to the messenger program to a vibration pattern while performing the messenger program, and the controller may control the operation of the vibration generation unit in response to the vibration pattern.

The portable terminal may transmit a response of the messenger to a user via a vibration pattern in terms of tactile sensation to enable enhancement of user convenience and satisfaction.

Embodiments of the present invention may also provide a driving method of a messenger program in a portable terminal that includes (a) receiving status information of a messenger program under execution in the portable terminal or a member (an opponent) relative to the messenger program, (b) determining a vibration pattern in response to the status information, and (c) vibrating the portable terminal in response to the determined vibration pattern.

In such a driving method, a user can use tactile sensation and motion even under circumstance of inconvenient key/touch screen manipulation.

One advantageous effect of the portable terminal and a driving method of messenger program may be that convenience and satisfaction for messenger service user can be enhanced by the interface that utilizes the tactile sensation.

The term 'messenger' may refer to a service capable of performing an intermittent chatting for a long time by grouping parties desiring to chat (including text, voice and image formats, for example) according to special chat rooms using common communication networks such as the Internet. An exemplary messenger service may include MSN of Microsoft Inc.

Although the messenger service is described with respect to the portable terminal, embodiments are not limited to messenger service on the portable terminal, but may be applied to any service as long as a user of a portable terminal may group interested parties and read status information of the grouped parties.

The term 'pattern' may refer to a set of 'repeated shapes/designs' out of various glossarial definitions with regard to the pattern. 'Shapes/designs' does not refer to shapes/designs in terms of visible meaning but rather to shapes/designs of signal changes in particular parameters within a predetermined time interval.

The term 'user' may refer to a person who uses a portable terminal. The term may refer to a person who uses a messenger program which is an object communicating with the messenger program according to the messenger service.

The term 'status information' relative to the messenger service may refer to a broad concept including environment information and response to program in utilizing the messenger service. In other words, 'status information' may refer to a response to a messenger program, status information of a wireless communication network on the portable terminal in which the messenger program is being executed, status information of a messenger program of a member (or an opponent) and/or status information of a portable terminal in which a messenger program of the member is being executed, a response to the program, etc.

The 'status information' may refer to a concept including 'messenger use status information' which is information relative to how a user/opponent currently uses the messenger program. The 'messenger use status information' may include items such as online, offline, away, and busy.

A portable terminal may be wirelessly connected to an electronic computing device constituting a wireless communication network of a business providing a communication service, and may be connected to an internet service providing server providing various internet services including messengers and the like via the wireless communication network.

The portable terminal may be a mobile phone, a smart phone, a notebook computer, a digital broadcasting terminal, a PDA (Personal Digital Assistance), a PMP (Portable Multimedia Player) and a GPS navigation device and the like.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A portable terminal comprising:
    a vibration generation unit for vibrating the portable terminal; and
    a controller for receiving information regarding a member of a list of a telephone directory, the controller for determining a vibration pattern based on the received information, and the controller for controlling operation of the vibration generation unit based on the determined vibration pattern,
    wherein the controller displays a vibration pattern registration screen, the controller receives a new vibration pattern for a specific member of the list of the telephone directory, the controller stores the new vibration pattern, and the controller assigns the new vibration pattern for the specific member of the list of the telephone directory such that the new vibration pattern corresponds to the specific member, wherein the new vibration pattern is identified by an intensity pattern over a predetermined period of time, and
    wherein when the specific member of the list of the telephone directory contacts the portable terminal by a mobile communication, the controller controls the vibration generation unit to output the vibration pattern corresponding to the specific member of the list of the telephone directory.

2. The portable terminal of claim 1, wherein when the controller determines that a vibration pattern to be newly stored is similar to a previously stored vibration pattern, the controller informs a user of the portable terminal that a similar pattern is already stored.

3. The portable terminal of claim 1, wherein the information includes status information of a given one of the members of the list of the telephone directory.

4. The portable terminal of claim 3, wherein the controller receives the status information of the given one of the members, and the controller determines the corresponding vibration pattern based on the received status information.

5. The portable terminal of claim 3, wherein the controller determines a message group identifier when the status information changes, and the controller determines the vibration pattern that corresponds to the determined message group identifier.

6. The portable terminal of claim 1, wherein the controller receives position information of a given one of the members of the list of the telephone directory and the controller determines the corresponding vibration pattern based on the received position information.

7. The portable terminal of claim 1, wherein the controller selects one of a plurality of vibration patterns based on a signal transmitted from a user of the portable terminal.

8. The portable terminal of claim 1, further comprising:
    a storage device that includes a status information-vibration pattern database in which a first field includes information on status and a second field includes information on vibration patterns.

9. The portable terminal of claim 1, further comprising an input device for receiving pointing information for the list of the telephone directory from a user of the portable terminal.

10. The portable terminal of claim 9, wherein the input device comprises one of a touch screen, a touch pad or a track ball.

11. The portable terminal of claim 1, wherein the controller repeatedly outputs the vibration pattern corresponding to the specific member.

12. The portable terminal of claim 11, wherein the controller outputs the vibration pattern corresponding to the specific member at specific intervals of time.

13. The portable terminal of claim 1, further comprising an input device for a user of the portable terminal to input the new vibration pattern to the portable terminal.

14. The portable terminal of claim 13, wherein the user of the portable terminal inputs the new vibration pattern via the input device by moving a pointing device, wherein an amplitude, a frequency, a delay time or an interval can be designated by the user of the portable terminal.

15. The portable terminal of claim 14, wherein the input device comprises a touch screen.

16. The portable terminal of claim 1, wherein the mobile communication is a message from the specific member of the list of the telephone directory.

17. A method of using a portable terminal, the method comprising:
    receiving information of a member of a list of a telephone directory in the portable terminal;
    determining a vibration pattern based on the received information;
    vibrating the portable terminal based on the determined vibration pattern;
    displaying a vibration pattern registration screen,
    receiving a new vibration pattern on the displayed vibration pattern registration screen for a specific member of the list of the telephone directory;
    storing the new vibration pattern; and
    assigning the new vibration pattern for the specific member of the list of the telephone directory such that the stored new vibration pattern corresponds to the specific member, wherein the new vibration pattern is identified by an intensity pattern over a predetermined period of time, and wherein when the specific member of the list of the telephone directory contacts the portable terminal by a mobile communication, the controller controls the vibration generation unit to output the vibration pattern that corresponds to the specific member of the list of the telephone directory.

18. The method of claim 17, further comprising setting up status information inputted into the portable terminal and storing the status information.

19. The method of claim 17, wherein the information includes position information of the specific member of the list of the telephone directory.

20. The method of claim 17, wherein determining the vibration pattern includes combining a first vibration pattern and a second vibration pattern based on different types of the information.

21. The method of claim 17, wherein the information is status information comprising one of offline, online, busy or away.

22. The method of claim 17, further comprising changing the vibration pattern that corresponds to the specific member based on a change of the information for the specific member, and vibrating the portable terminal based on the vibration pattern that corresponds to the specific member.

23. The method of claim 17, further comprising determining output times of the vibration pattern that corresponds to the specific member between the determining of the vibration pattern that corresponds to the specific member and the vibrating of the portable terminal.

24. The method of claim 17, further comprising determining the vibration pattern that corresponds to the specific member by moving a pointing device over a touch screen of the portable terminal.

25. The method of claim 24, further comprising saving the vibration pattern that corresponds to the specific member in a memory of the portable terminal.

26. The method of claim 17, further comprising providing a vibration when the information changes for the specific member.

27. The method of claim 26, wherein the vibration pattern that corresponds to the specific member includes the changed information for the specific member.

28. A portable terminal comprising:
    a touch screen to receive an input from a user that represents a vibration pattern for the terminal;
    a memory to store the vibration pattern;
    a vibration generator to generate the vibration pattern of the portable terminal based on the stored vibration pattern; and
    a controller for receiving information regarding a specific member of a list of a telephone directory, the controller for determining a vibration pattern that corresponds to the specific member based on the received information, and the controller for controlling operation of the vibration generator based on the vibration pattern that corresponds to the specific member, wherein when the controller determines that a vibration pattern to be newly stored in the memory is similar to a previously stored vibration pattern, the controller informs the user that a similar pattern is already stored in the memory.

29. A portable terminal comprising:
    a vibration generation unit for vibrating the portable terminal; and
    a controller for receiving information regarding a member of a list of a telephone directory, for determining a vibration pattern that corresponds to the member based on the received information, and for controlling operation of the vibration generation unit based on the determined vibration pattern,
    wherein the controller displays a vibration pattern registration screen, the controller receives a new vibration pattern for the member of the list of the telephone directory, the controller stores the new vibration pattern, and the controller assigns the new vibration pattern to the member of the list of the telephone directory, and
    wherein when the terminal receives a communication from the member of the list of the telephone directory, the controller controls the vibration generation unit to output the new vibration pattern that corresponds to the member of the list of the telephone directory.

* * * * *